(12) United States Patent
Tanaka et al.

(10) Patent No.: US 8,244,829 B2
(45) Date of Patent: Aug. 14, 2012

(54) DATA TRANSMITTING APPARATUS, DATA RECEIVING APPARATUS, DATA TRANSMITTING METHOD AND DATA RECEIVING METHOD

(75) Inventors: Michiko Tanaka, Osaka (JP); Toshihiko Munetsugu, Osaka (JP)

(73) Assignee: Panasonic Corporation, Osaka (JP)

( * ) Notice: Subject to any disclaimer, the term of this patent is extended or adjusted under 35 U.S.C. 154(b) by 170 days.

(21) Appl. No.: 12/728,708

(22) Filed: Mar. 22, 2010

(65) Prior Publication Data

US 2010/0262674 A1   Oct. 14, 2010

Related U.S. Application Data

(60) Provisional application No. 61/163,215, filed on Mar. 25, 2009.

(51) Int. Cl.
*G06F 15/16* (2006.01)
(52) U.S. Cl. ....................................... 709/217
(58) Field of Classification Search ............. 709/217, 709/228
See application file for complete search history.

(56) References Cited

U.S. PATENT DOCUMENTS

| | | | |
|---|---|---|---|
| 7,127,735 B1 * | 10/2006 | Lee et al. ........................ | 725/87 |
| 7,466,705 B2 * | 12/2008 | Saito et al. ..................... | 370/392 |
| 7,644,172 B2 * | 1/2010 | Stewart et al. ................. | 709/231 |
| 7,954,128 B2 * | 5/2011 | Maynard et al. ............... | 725/88 |
| 2002/0165987 A1 | 11/2002 | Arisaka et al. | |
| 2004/0103120 A1 * | 5/2004 | Fickle et al. ............... | 707/104.1 |
| 2008/0320375 A1 | 12/2008 | Hori et al. | |
| 2009/0037596 A1 * | 2/2009 | Math et al. ..................... | 709/231 |
| 2009/0204719 A1 * | 8/2009 | Simongini et al. ............ | 709/231 |
| 2009/0300231 A1 | 12/2009 | Munetsugu | |
| 2010/0074333 A1 * | 3/2010 | Au et al. ..................... | 375/240.12 |

FOREIGN PATENT DOCUMENTS

| | | |
|---|---|---|
| JP | 2001-346187 | 12/2001 |
| JP | 2002-328949 | 11/2002 |
| JP | 2003-174636 | 6/2003 |
| JP | 2005-323068 | 11/2005 |
| JP | 2006-270729 | 10/2006 |
| JP | 2007-158854 | 6/2007 |
| JP | 2008-085936 | 4/2008 |
| JP | 2008-131195 | 6/2008 |
| JP | 2008-283368 | 11/2008 |
| WO | 2007/072680 | 6/2007 |
| WO | WO2007/072680 | * 6/2007 |

OTHER PUBLICATIONS

ContentDirectory:1 Service Template Version 1.01, for UPnP(TM) Version 1.0, Jun. 25, 2002.

* cited by examiner

*Primary Examiner* — Larry Donaghue
(74) *Attorney, Agent, or Firm* — Greenblum & Bernstein, P.L.C.

(57) ABSTRACT

A data transmitting apparatus, which implements a RESUME function which is capable of properly setting a resume position and capable of setting plural resume positions, executes a Java™ application program and includes: a memory for storing content and content attribute information; a network unit which transmits a content to a data receiving apparatus; an action request receiving and responding unit which receives an update request indicating a resume position, from the data receiving apparatus; and a resume position managing unit which updates content attribute information stored in the memory in accordance with the received update request, so that such resume position and a resume position identifier are included in the content attribute information.

9 Claims, 30 Drawing Sheets

107 Multimedia delivery system

| Java program identifier 1101 | Control information 1102 | DSMCC identifier 1103 | Program name 1104 |
|---|---|---|---|
| 301 | autostart | 1 | /a/TopXlet |
| 302 | present | 1 | /b/GameXlet |

1111 — row with 301
1112 — row with 302

FIG. 14

```
<ContentAttributes>
<ContentID> 1 </ContentID>
<ParentID>ContainerID00</ParentID>
<FileName> 0001.m2ts </FileName>
<ChannelID> 1 </ChannelID>
<ProgramNo> 101 </ProgramNo>
<Title> Movie AAA </Title>
<Genre> Movie</Genre>
<Date> 2005/8/28 19:00 </Date>
<RecordDate> 2005/8/28 19:00 </RecordDate>
    <ocap:PresentationPoint friendly_name="Livingroom"> 00:30:00   1401
    </ocap:PresentationPoint>
</ContentAttribute>
```

Content attribute information

| | | |
|---|---|---|
| 1511 | ContentID00 | 0001.attr |
| 1512 | ContentID01 | 0002.attr |
| 1513 | ContentID02 | 0003.attr |

1321 Attribute information table

FIG. 18

| 1801 | 1802 | 1803 |
|---|---|---|
| ContentID00 | -1 | |
| ContentID01 | -1 | |
| ContentID02 | -1 | |

1811
1812
1813

1332 Resume position information table

FIG. 19

| ContentID00 | 00:30:00 | LivingRoom |
|---|---|---|
| ContentID01 | -1 | |
| ContentID02 | -1 | |

1801   1802   1803

1332 Resume position information table 1911  1812  1813

FIG. 20

| | 1801 | 1802 | 1803 | 2004 | 2005 | 2006 |
|---|---|---|---|---|---|---|
| 2011 | ContentID00 | 00:30:00 | LivingRoom | 1 | 1 | 1 |
| 2012 | ContentID00 | 00:45:00 | Bob's Room | 1 | 2 | 2 |
| 2013 | ContentID01 | -1 | | | | |
| 2014 | ContentID02 | -1 | | | | |

1332 Resume position information table

FIG. 22

```
<DIDL-Lite xmlns="urn:schemas-upnp-org:metadata-1-0/DIDL-Lite/"
 xmlns:dc="http://purl.org/dc/elements/1.1/"
 xmlns:upnp="urn:schemas-upnp-org:metadata-1-0/upnp/"
 xmlns:dlna="urn:schemas-dlna-org:metadata-1-0/">
 <item id="ContentID00" parentID="ContainerID00" restricted="1">
  <dc:title>Content Title</dc:title>
  <dc:date>2009-03-05T10:00:00</dc:date>
  <upnp:class>object.item.videoItem</upnp:class>
  <res protocolInfo="http-get:*:video/mpeg:DLNA.ORG_PN=MPEG_TS_NA_ISO "
   duration="0:45:01.733" >
   http://192.168.0.3/AVData/0001.m2ts
  </res>
 </item>
</DIDL-Lite>
```
⎱ Content attribute information

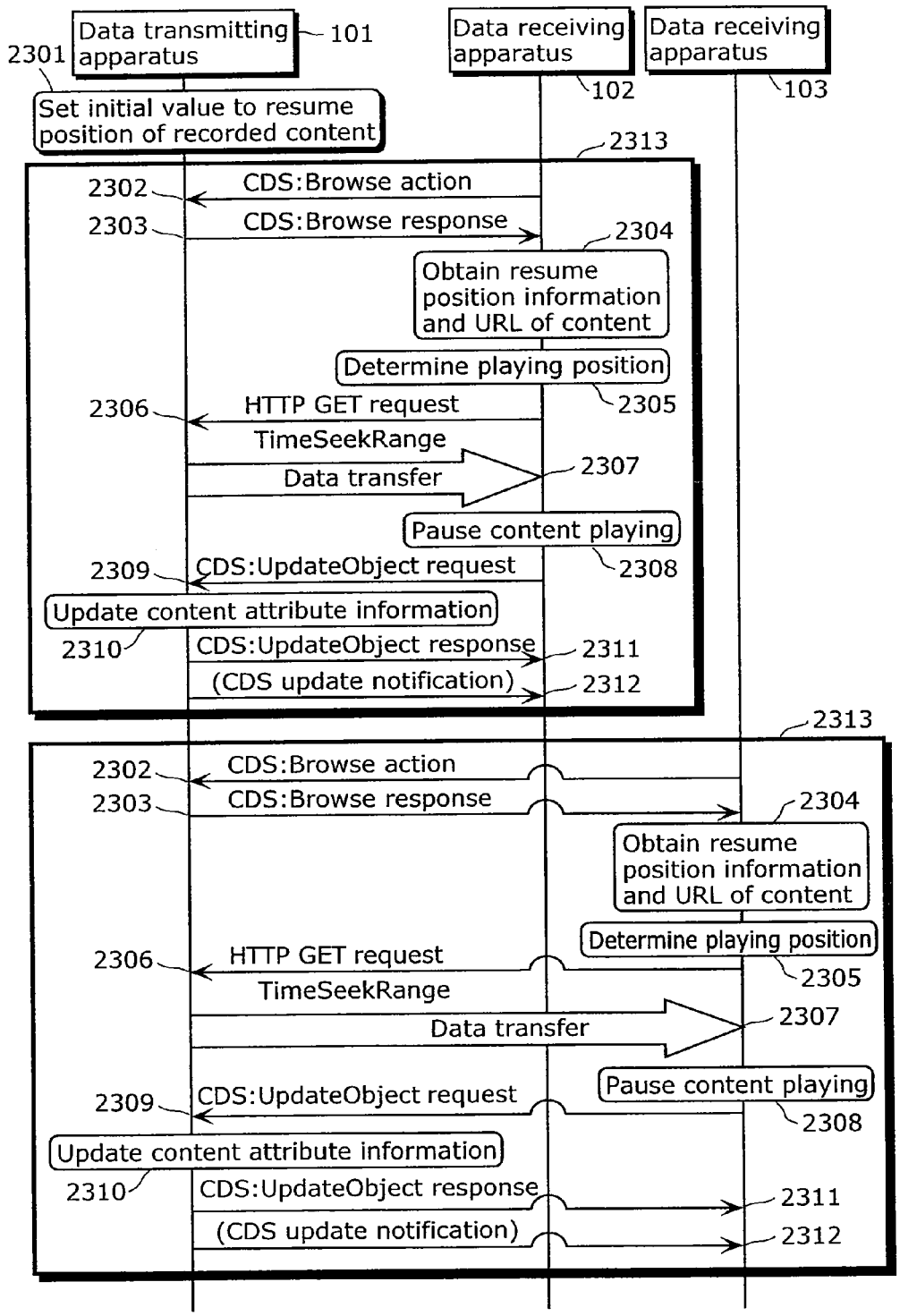

FIG. 24

Content attribute information

```
<DIDL-Lite xmlns="urn:schemas-upnp-org:metadata-1-0/DIDL-Lite/"
    xmlns:dc="http://purl.org/dc/elements/1.1/"
    xmlns:upnp="urn:schemas-upnp-org:metadata-1-0/upnp/"
    xmlns:dlna="urn:schemas-dlna-org:metadata-1-0/" >
<item id="ContentID00" parentID="ContainerID00" restricted="1">
    <dc:title>Content Title</dc:title>
    <dc:date>2009-03-05T10:00:00</dc:date>
    <upnp:class>object.item.videoItem</upnp:class>
    <res protocolInfo="http-get:*:video/mpeg:DLNA.ORG_PN=MPEG_TS_NA_ISO "
        duration="0:45:01.733" >
        http://192.168.0.3/AVData/0001.m2ts
    </res>
    <desc id="desciD00" xmlns:ocap="urn:schemas-opencable-com"
        nameSpace="urn:schemas-opencable-com">
        <ocap:PresentationPoint date = "2009-03-10T19:37">00:30:00</ocap:PresentationPoint>
    </desc>
</item>
</DIDL-Lite>
```

```
<DIDL-Litexmlns="urn:schemas-upnp-org:metadata-1-0/DIDL-Lite/"
    xmlns:dc="http://purl.org/dc/elements/1.1/"
    xmlns:upnp="urn:schemas-upnp-org:metadata-1-0/upnp/"
    xmlns:dlna="urn:schemas-dlna-org:metadata-1-0/">
<item id="ContentID00" parentID="ContainerID00" restricted="1" >
    <dc:title>Content Title</dc:title>
    <dc:date>2009-03-05T10:00:00</dc:date>    ────Content attribute information
    <upnp:class>object.item.videoItem</upnp:class>
    <res protocolInfo="http-get:*:video/mpeg:DLNA.ORG_PN=MPEG_TS_NA_ISO "
        duration="0:45:01.733" >
        http://192.168.0.3/AVData/0001.m2ts
    </res>
    ┌──────────────────────────────────────────────────────────────────┐ 2501
    │<desc id="descID00"xmlns:ocap="urn:schemas-opencable-com"         │
    │    nameSpace="urn:schemas-opencable-com" >                       │
    │   <ocap:PresentationPoint friendly_name="LivingRoom">00:30:00    │
    │   </ocap:PresentationPoint>                                      │
    │   <ocap:PresentationPoint friendly_name="Tom'sRoom">00:45:00     │
    │   </ocap:PresentationPoint>                                      │
    │   <ocap:PresentationPoint friendly_name="Kitchen">00:20:00       │
    │   </ocap:PresentationPoint>                                      │
    │</desc>                                                           │
    └──────────────────────────────────────────────────────────────────┘
</item>
</DIDL-Lite>
```

FIG. 30

(1) public Device[] getDevice()
(2) Public interface Device
(3) public interface ContentServer

FIG. 31

```
public interface Device {
   public ContetntServer getContentServer();
   public boolean isLocal();
   public void setDeviceProperty(String key, String value)
}
```

FIG. 32

```
public interface ContentServer {
  public Container getRootContainer() ;
  public CDSObject[] requestBrowse(String objectID, String flag, String filter,
                   int startIndex,  int requestedCount, String sortCriteria) ;
}
```

FIG. 33

(1) public interface CDSObject
(2) public interface Container
(3) public interface ContentItem
(4) public class Metadata
(5) public interfce NetActionHandler

FIG. 34

```
public interface CDSObject{
   public String getID() ;
   public String getParentID() ;
   public String getClass() ;
   public Metadata getMetadata) ;
}
```

FIG. 35

```
public interface Container extends CDSObject{
   public int getChildCount() ;
   public CDSObjct[] getChildren() ;
   public CDSObject getChild(String objectID) ;
}
```

FIG. 36

```
public interface ContentItem extends CDSObject{
   public requestSetMediaTime(Javax.mediaTime time,
                              String Identifier,
                              NetActionHandler handler);
}
```

FIG. 37

```
public class Metadata{
    public String[]  getKeys()
    public Object getMetadata(String key) ;
}
```

FIG. 38

```
public interface NetActionHandler{
   void notify(NetActionEvent event);
}
```

DATA TRANSMITTING APPARATUS, DATA RECEIVING APPARATUS, DATA TRANSMITTING METHOD AND DATA RECEIVING METHOD

CROSS REFERENCE TO RELATED APPLICATION(S)

This application claims the benefit of U.S. Provisional Application No. 61/163,215, filed Mar. 25, 2009, the contents of which are herein incorporated by reference in its entirety.

BACKGROUND OF THE INVENTION (1) Field of the Invention

The present invention relates to data transmitting apparatuses and the like, which perform outputting of multimedia digital content to a network, and the like, and control thereof, and to data receiving apparatuses and the like, which perform receiving of digital content and control thereof.

(2) Description of the Related Art

In recent years, contents of digital broadcasts received by a digital broadcast receiver, or digital contents stored in a recorder in a house can now be viewed in other rooms by using a home network.

With regard to such sharing of digital content using a home network, there is an active move to make such sharing possible not only between Consumer Electronics (CE) devices such as televisions and Digital Video Recorders (DVR), but also between all devices connected to a home network, including mobile information terminals referred to as personal computers (PC) and Personal Digital Assistants (PDA). To be more specific, standardization organizations such as the Digital Living Network Alliance (DLNA) have laid-out and made public standards and implementing guidelines for this purpose.

In such content sharing, the methods defined in the UPnP AV Architecture (UPnP AV) (Non-Patent Reference 1: ContentDirectory: 1 Service Template Version 1.01 For UPnP™ Version 1.0, Jun. 25, 2002) are used in the mutual recognition of the devices and the exchange of information of the contents that can be used, between a server (for example, a set top box or DVR which receives digital broadcasts) and a client (for example, a personal computer or a digital player) in the home network. In UPnP AV, upon receiving an inquiry from the client, the server replies with a list of provided contents and respective content attribute information. Furthermore, as a mandatory protocol for transmission of content data, Hypertext Transfer Protocol (HTTP) is used in DLNA.

In such a home network environment, it is possible to implement a RESUME function in which a content viewed by a user in a living room is stopped and the continuation of the same content is viewed in a bedroom.

As a method for implementing such a RESUME function, Japanese Unexamined Patent Application Publication No. 2007-158854 (Patent Reference 1) discloses a method of storing resume positions in a server in association with user information. However, in a general home network standard such as UPnP AV and the like, although the server can set an arbitrary resume position as unique information, a method of setting an arbitrary resume position from a client to a server is not defined. As such, the resume position cannot be shared with devices of different manufacturers or different models which cannot interpret such unique information.

In addition, as an example for solving such a problem, Japanese Unexamined Patent Application Publication No. 2005-323068 (Patent Reference 2) discloses a method in which, in the setting of a resume position, mid-way starting content information is created and the paused content is also represented as one content. This method enables the implementation of the RESUME between devices even when the devices are of different manufacturers. However, in the method in Japanese Unexamined Patent Application Publication No. 2005-323068, the number of mid-way starting contents increases every time the pausing of viewing is repeated for a content. Furthermore, in the home network environment, there is a possibility that the number of mid-way starting contents will further increase since viewing and pausing are performed by each member of a family. This means that there is a possibility that, when a user is selecting the resume position for his own pausing, it may be difficult to recognize which mid-way starting content to select, and thus convenience may suffer.

Furthermore, in recent years, it has become possible for STBs and the like, which receive a digital broadcast, to receive an application program included in a broadcast signal and execute the received application program. For example, in the OpenCable Application Platform (OCAP) standard which is a North American cable television standard, a Java application program is transmitted through a broadcast signal and the Java application program is executed in a television or STB which receives the broadcast signal. Here, the Cable Television Laboratories, Inc. (CableLabs) of North America is undertaking the standardization of an OCAP home network extension for downloading and executing a Java application program which implements the functions of a server or a client or both.

Furthermore, International Publication No. 2007/072680 Pamphlet (Patent Reference 3) discloses a method of managing resume positions and implementing RESUME in an environment in which such a Java application program is downloaded and executed. The method disclosed in International Publication No. 2007/072680 Pamphlet is characterized in that, when a server receives a playing pause request from a client, the server calculates a resume position and stores the calculated resume position.

However, with the method disclosed in International Publication No. 2007/072680 Pamphlet, that is, the method in which the server sets the resume position, there is a possibility that the position at which the user has paused the viewing may be different from the resume position that is set by the server. The main reason for this is that the position at which the user pauses the viewing is the position at which playing was performed last at the client, whereas, in general, at the server, it is not possible to recognize the position at which the client has last performed playing, and thus the position of data that was transmitted last to the client is judged as the resume position. Specifically, although buffering which temporarily stores received data is generally performed at the client, this buffering is not taken into consideration.

SUMMARY OF THE INVENTION

In view of this, the present invention has as an object to implement a RESUME function which enables correct setting of a resume position for playing and enables setting of plural resume positions, in a home network environment in which common attribute information can be interpreted and an application program can be downloaded and executed even between devices having different manufacturers.

In order to solve the aforementioned conventional problem, the to data transmitting apparatus according to an aspect of the present invention is a data transmitting apparatus which executes a Java™ application program, stores multimedia content including at least one of video and audio, and transmits the multimedia content to a receiving apparatus via a network, the data transmitting apparatus including: a storage unit configured to store the multimedia content and attribute information of the multimedia content; a transmitting unit configured to transmit at least part of the multimedia content to the receiving apparatus; a receiving unit configured to receive, from the receiving apparatus, an update request which indicates a resume position and requests updating of the attribute information, the resume position being a position, in the multimedia content to be transmitted by the transmitting unit to the receiving apparatus, at which playing is to be resumed; and a managing unit configured to update the attribute information stored in the storage unit, in accordance with the update request received by the receiving unit, so that the resume position indicated by the update request and a resume position identifier for identifying the resume position are included in the attribute information.

Accordingly, since the resume position is managed by being included in attribute information in association with a resume position identifier, in an environment in which a Java application program is executed (for example, OCAP Standard environment), the resume position in the attribute information can be interpreted even between devices of different manufacturers, and it is possible to implement a RESUME function capable of setting plural resume positions. In addition, an update request indicating the resume position is received from the receiving apparatus, and thus, for example, in the case where at least part of the multimedia content transmitted to the receiving apparatus is played and paused by the receiving apparatus, and so on, it is possible to correctly set the resume position from which playing is to be resumed in the multimedia content, and thus viewing of the multimedia content can be properly resumed.

Furthermore, the receiving unit may be configured to receive, from the receiving apparatus, the update request indicating the resume position and the resume position identifier, and the managing unit may be configured to update the attribute information stored in the storage unit so that the resume position and the resume position identifier indicated by the update request are included in the attribute information.

With this, the receiving apparatus is able to set the resume position identifier, and thus such resume position identifier can be made significant for the receiving apparatus. As a result, the receiving apparatus can easily interpret the resume position identifier, and can make use of resume position selection in accordance with the resume position identifier.

Furthermore, the receiving unit may be configured to receive the update request indicating application information regarding a Java application program that runs on the receiving apparatus, and the managing unit may be further configured to determine, using the application information indicated by the update request, whether or not to update the attribute information in accordance with the update request, and to update the attribute information stored in the storage unit upon determining that the attribute information should be updated.

With this, the judgment for whether or not updating is permitted is made using the application information indicated by the update request, and thus, when an update request indicating inappropriate application information is received, updating according to such update request can be prevented, and thus security can be improved. For example, in an environment where plural Java application programs run on the receiving apparatus, the update request for which updating of attribute information is acknowledged can be selected by using the application information thereof.

Furthermore, the managing unit may be further configured to set the resume position identifier, and to update the attribute information stored in the storage unit so that the resume position indicated by the update request and the resume position identifier that has been set are included in the attribute information.

With this, even when the resume position identifier is not set by the receiving apparatus, it is possible to set the appropriate resume position identifier and manage the resume position at the data transmitting apparatus-side.

Furthermore, the managing unit may be configured to set the resume position identifier using information of the receiving apparatus obtained from the receiving apparatus.

Accordingly, since the resume position identifier is set using information of the receiving apparatus (for example, an apparatus-set identifier) obtained from the receiving apparatus, the receiving apparatus which has paused the viewing of the multimedia content can be identified from the resume position identifier.

In order to solve the aforementioned conventional problem, the data receiving apparatus according to an aspect of the present invention is a data receiving apparatus which receives multimedia content including at least one of video and audio, from a transmitting apparatus via a network, the data receiving apparatus including: a Java executing unit configured to execute a Java™ application program; a receiving unit configured to receive at least part of the multimedia content and attribute information of the multimedia content from the transmitting apparatus via the network; a managing unit configured to generate an update request according to an instruction from the Java application program executed by the Java executing unit, the update request indicating a resume position and requesting updating of the attribute information to the transmitting apparatus, the resume position being a position, in the multimedia content to be received by the receiving unit, at which playing is to be resumed; and a transmitting unit configured to transmit the update request generated by the managing unit to the transmitting apparatus.

With this, for example, in the case where at least part of the multimedia content received by the receiving unit of the data receiving apparatus is played then stopped, an update request indicating the resume position, from which playing is to be resumed in the multimedia content, is generated and transmitted to the transmitting apparatus, and thus the position at which the user has paused the viewing can be precisely registered, as the resume position, in the attribute information of the transmitting apparatus.

Furthermore, the managing unit may be configured to receive the resume position and a resume position identifier for identifying the resume position from the Java application program executed by the Java executing unit, and to generate the update request indicating the resume position and the resume position identifier that have been received.

Accordingly, since an update request indicating the resume position and the resume position identifier received from the Java application program is generated, the resume position identifier can be made significant for the Java application program or the user.

Furthermore, the managing unit may be configured to set a resume position identifier for identifying the resume position, based on information recorded in the data receiving apparatus, and to generate the update request indicating the set resume position identifier and the resume position.

Accordingly, since the resume position identifier is set based on information recorded in the data receiving apparatus, it is possible to cause the transmitting apparatus to perform resume position management using a resume position identifier indicating information recorded in the data receiving apparatus.

Furthermore, the information recorded in the data receiving apparatus may be application information regarding the Java application program, and the managing unit may be configured to set the application information as the resume position identifier.

With this, it is possible to cause the transmitting apparatus to perform resume position management using a resume position identifier indicating application information. As a result, in the transmitting apparatus, it is possible to select and use the resume position identifier and resume position stored in the transmitting apparatus in accordance with the application information indicated by the update request, and whether or not it is permitted to update the resume position identifier and resume position stored in the transmitting apparatus can be judged in accordance with the application information indicated by the update request.

Furthermore, the information recorded in the data receiving apparatus may be information set by the Java application program, regarding the data receiving apparatus, and the managing unit may be configured to set the information regarding the data receiving apparatus as the resume position identifier.

Accordingly, since the resume position identifier is information set by the Java application program regarding the data receiving apparatus, the resume position identifier can be used uniformly in respective devices regardless of the device's manufacturer, and so on, as long as they are devices which can download and execute such Java application program.

It is to be noted that the present invention can be implemented, not only as a data transmitting apparatus and a data receiving apparatus as described above, but also as a multimedia delivery system including the data transmitting apparatus and the data receiving apparatus, methods for the process operations in each apparatus, a program for causing a computer to execute such process operations, a recording medium on which the program is stored, or an integrated circuit. Furthermore, the present invention may be implemented by arbitrarily combining the respective units for solving the above-described problem.

FURTHER INFORMATION ABOUT TECHNICAL BACKGROUND TO THIS APPLICATION

The disclosure of U.S. Provisional Application No. 61/163,215 filed on Mar. 25, 2009, including specification, drawings and claims, is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 14 is a diagram showing an example of content attribute information in the embodiment of the present invention;

FIG. 15 is a chart showing an example of an attribute information table in the embodiment of the present invention;

FIG. 18 is a chart showing an example of a resume position information table in the embodiment of the present invention;

FIG. 19 is a chart showing an example of the resume position information table in the embodiment of the present invention;

FIG. 20 is a chart showing an example of the resume position information table in the embodiment of the present invention;

FIG. 22 is a diagram showing an example of content attribute information in the embodiment of the present invention;

FIG. 23 is a diagram showing an example of the process sequence between the data transmitting apparatus and the data receiving apparatuses in the embodiment of the present invention;

FIG. 24 is a diagram showing an example of content attribute information in the embodiment of the present invention;

FIG. 25 is a diagram showing an example of content attribute information in the embodiment of the present invention;

FIG. 30 is a diagram showing an example of Java APIs provided in the network library 2704d in the embodiment of the present invention;

FIG. 31 is a diagram showing an example of Java APIs provided in the network library 2704d in the embodiment of the present invention;

FIG. 32 is a diagram showing an example of Java APIs provided in the network library 2704d in the embodiment of the present invention;

FIG. 33 is a diagram showing an example of Java APIs provided in the network library 2704d in the embodiment of the present invention;

FIG. 34 is a diagram showing an example of Java APIs provided in the network library 2704d in the embodiment of the present invention;

FIG. 35 is a diagram showing an example of Java APIs provided in the network library 2704d in the embodiment of the present invention;

FIG. 36 is a diagram showing an example of Java APIs provided in the network library 2704d in the embodiment of the present invention;

FIG. 37 is a diagram showing an example of Java APIs provided in the network library 2704d in the embodiment of the present invention;

FIG. 38 is a diagram showing an example of Java APIs provided in the network library 2704d in the embodiment of the present invention.

DESCRIPTION OF THE PREFERRED
EMBODIMENT(S)

Hereinafter, the embodiment of the present invention shall be described with reference to the drawings.

Figure 1:
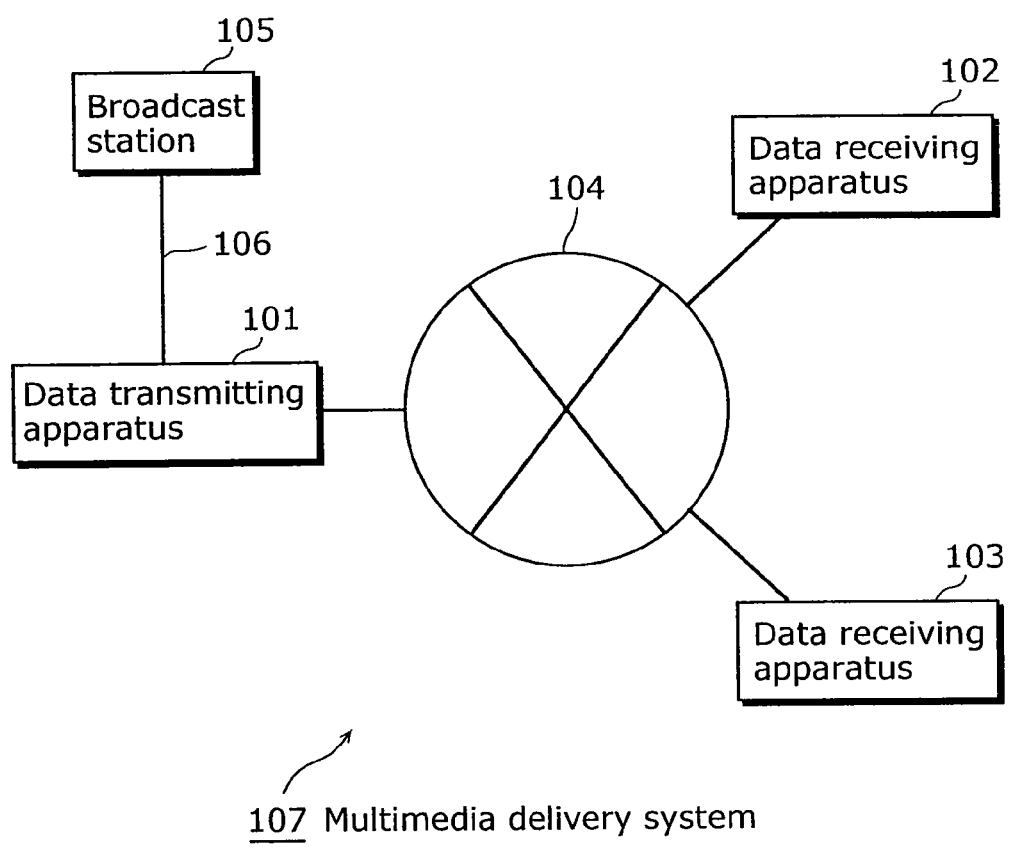
FIG. 1 is a configuration diagram for a multimedia delivery system in an embodiment of the present invention.

FIG. 1 is a configuration diagram for a multimedia delivery system in an embodiment of the present invention. In FIG. 1, 101 denotes a data transmitting apparatus, 102 and 103 each denote a data receiving apparatus, 104 denotes a network, 105 denotes a broadcast station for cable television, 106 denotes a cable connecting the data transmitting apparatus 101 and the broadcast station 105, and 107 denotes a multimedia delivery system configured of the above constituent elements. The data transmitting apparatus 101, the data receiving apparatus 102, and the data receiving apparatus 103 are connected to the network 104, and can communicate with each other via the network.

The data transmitting apparatus 101 in the present embodiment is a CATV Set Top Box (STB) which includes a network interface and a storage unit for storing multimedia content (hereafter called multimedia data or content), and which receives a digital broadcast. The data transmitting apparatus 101 is connected to the broadcast station 105 via the cable 106. In addition, the data transmitting apparatus 101 is capable of executing a Java application program (hereafter called Java application or application) delivered by the broadcast station 105, implementing various functions, and controlling functions included in the data receiving apparatus 102 or 103. In the present embodiment, the data transmitting apparatus 101 controls, through the Java application, a server function of providing the sharing of stored multimedia data to the data receiving apparatus 102 or 103 connected to the home network, and functions related to the server function. Hereinafter, a Java application which performs such operations shall be called a server application. It is to be noted that the receiving and activation of a Java application shall be described later.

Furthermore, the data transmitting apparatus 101 stores the multimedia data of a received digital broadcast content, and the like, in the storage unit. Furthermore, the data transmitting apparatus 101 is connected to the network 104 via the network interface. In addition, it receives requests from the data receiving apparatus 102 and the data receiving apparatus 103 that are transmitted through the network 104. Subsequently, in response to the requests, the data transmitting apparatus 101 transmits, to the data receiving apparatus 102 and the data receiving apparatus 103, through the network 104, attribute information for each content of digital broadcasts received, attribute information for each content stored, or multimedia data. As such, the data transmitting apparatus 101 manages the stored contents so as to enable the sharing of the stored contents between the data receiving apparatus 102 and the data receiving apparatus 103 via the network.

Upon receiving an operation by a user, the data receiving apparatus 102 and the data receiving apparatus 103 transmit, to the data transmitting apparatus 101, a transmission request for a list of contents that can be provided, and a transmission request for multimedia data and attribute information of the contents (hereafter called content attribute information). Furthermore, as a response to the request, the data receiving apparatus 102 and the data receiving apparatus 103 receive data from the data transmitting apparatus 101 and presents the data to the user. At this time, the data receiving apparatus 102 and the data receiving apparatus 103 can judge, based on the content attribute information received from the data transmitting apparatus 101, whether "playing currently paused" is set for the content, and can issue a request for multimedia data transmission resumption according to a request from the user. The data receiving apparatus 102 and the data receiving apparatus 103 each include a Java executing unit, and can execute a Java application received from the broadcast station 105, the data transmitting apparatus 101, the Internet, and so on. In the present embodiment, a client function of receiving the sharing of multimedia data provided by the data transmitting apparatus 101 is controlled by a Java application received from the broadcast station 105. Hereinafter, the Java application which performs such operation shall be called a client application.

Furthermore, the communication between the data transmitting apparatus 101 and the data receiving apparatus 102 and data receiving apparatus 103 via the network 104 is performed according to a protocol defined in DLNA. Specifically, as defined in DLNA Networked Device Interoperability Guidelines expanded Volume 1: Architectures and Protocols, searching for a server or a service provided by a server is performed in accordance with UPnP Device Architecture (DA), searching of contents and communication regarding the attributes of the content are performed in accordance with UPnP AV CDS, and transmission of digital data of a content is performed using Hypertext Transfer Protocol (HTTP). It is to be noted that the searching for a server or service and the transmission of multimedia data is outside the scope of the present invention, and thus the present invention is not limited by the methods thereof.

The network 104 is a home network established in the household, and is an IP network configured of the Ethernet, a wireless LAN, Multimedia over Coax Alliance (MoCA) or the like.

Hereinafter, the communication between the data transmitting apparatus 101 and the data receiving apparatus 102 and data receiving apparatus 103 and the respective operations thereof shall be described. It is to be noted that, although the server function of providing for the sharing of content to the data receiving apparatus 102 and the data receiving apparatus 103 shall be described with regard to the data transmitting apparatus 101, and the client function of receiving content attribute information and multimedia data from the data transmitting apparatus 101 shall be described with regard to the data receiving apparatus 102 and the data receiving apparatus 103 in order to simplify description, the same applies for a configuration in which each of the apparatuses has both the client function and the server function.

First, when the data transmitting apparatus 101, the data receiving apparatus 102, and the data receiving apparatus 103 are connected to the network 104, accessing of the data transmitting apparatus 101 from the data receiving apparatus 102 and the data receiving apparatus 103 becomes possible through the performance of advertising the server device and searching servers or services according to the method defined in UPnP DA.

First, when connected to the network 104, the data transmitting apparatus 101, which is a server device, advertises that it has joined the network 104, through a multicast over the network 104. When the data receiving apparatus 102 has already joined the network 104 and receives such notification, the data receiving apparatus 102 checks whether or not the notified server device is already known. In the case of an unknown server device, the data receiving apparatus 102 requests the data transmitting apparatus 101 for the transmission of detailed information of the server device and detailed information of the device or service provided by the server device. Upon obtaining information of the data transmitting apparatus 101 as a response to the request, the data receiving apparatus 102 stores such information. The client application can obtain the respective information of the server device from the data receiving apparatus 102. It is to be noted that the same operations as those for the data receiving apparatus 102 are performed with regard to the data transmitting apparatus 103.

On the other hand, when connected to the network 104, the data receiving apparatus 102 and the data receiving apparatus 103 perform the search for a server device by multicasting an inquiry regarding server devices connected to the network 104. When the data transmitting apparatus 101 has already joined the network 104 and receives such inquiry, the data transmitting apparatus 101 notifies the data receiving apparatus 102 and the data receiving apparatus 103 that it is a server device, as a response. Upon receiving the notification from the data transmitting apparatus 101, the data receiving apparatus 102 and the data receiving apparatus 103 request the data transmitting apparatus 101 for the transmission of detailed information of the server device and detailed information of the device or services provided by the server device. Upon obtaining information of the data transmitting apparatus 101 as a response to the request, the data receiving apparatus 102 and the data receiving apparatus 103 store such information.

Using the above-described method, the data receiving apparatus 102 and the data receiving apparatus 103 are able to recognize that the data transmitting apparatus 101 is a server device connected to the network 104, and recognize the services provided by the data transmitting apparatus 101. Refer to the UPnP DA Specification for the details of these processes.

Next, the process regarding the transmission of the list of contents and content attribute information performed between the data transmitting apparatus 101 and the data receiving apparatus 102 and data receiving apparatus 103 shall be described. This is performed in accordance with the method defined in DLNA and UPnP AV CDS. Refer to the DLNA Guidelines and the UPnP AV CDS Specifications for the details of the portions that are not described in the present embodiment.

First, the data transmitting apparatus 101 manages a data structure which is called a content directory and is provided from a server to a client in UPnP AV CDS. The content directory is configured such that contents have a tree structure as in the folders and files of a computer. An element corresponding to a folder is called a container and an element corresponding to a file is called an item. In general, a content is an item. Furthermore, a superordinate concept of the container and the item is called an object. Specifically, a container and an item are derived classes of an object.

Figure 21:
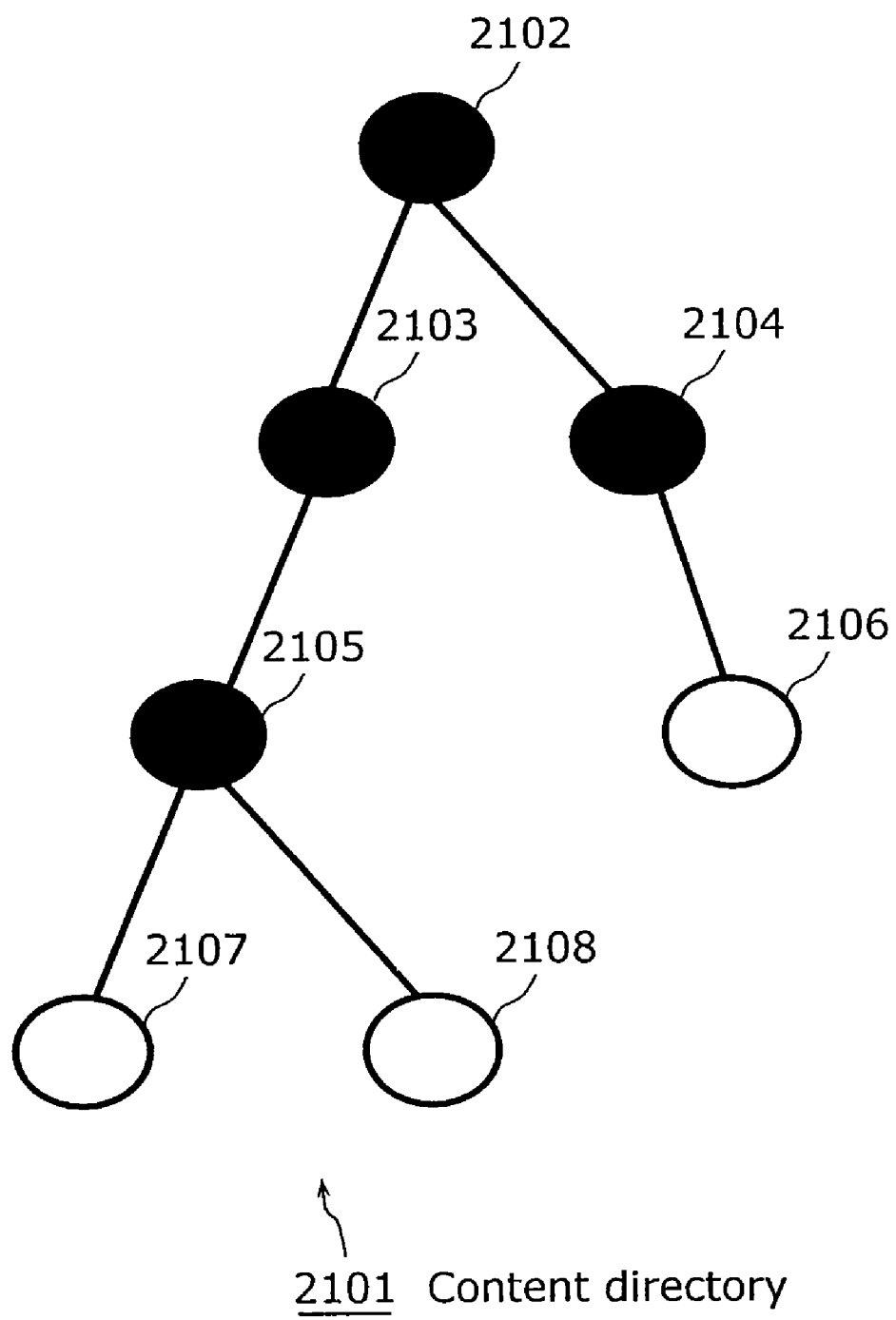
FIG. 21 is a diagram showing an example of a content directory in the embodiment of the present invention.

FIG. 21 is a diagram showing an example of a content directory. In FIGS. 21, 2102, 2103, 2104, and 2105 represent containers, and 2106, 2107, and 2108 represent items. In particular, a highest container such as the container 2102 is called a root container. Such a content directory may be constructed by a server application and may also be constructed by the data transmitting apparatus 101 to suit the format for storing into the storage unit. In the present embodiment, the content directory shall be constructed by the server application.

FIG. 22 is a diagram showing an example of content attribute information that is transmitted from the data transmitting apparatus 101 to a client such as the data receiving apparatus 102. However, in FIG. 22 only a portion regarding one content (item) is clipped out. As shown in FIG. 22, in UPnP AV CDS, each content attribute information is transmitted using an XML document.

The data transmitting apparatus 101 manages, for each object, the attribute information thereof. In the case of an item, the attribute information is content attribute information indicating the title, the broadcasting date and time, or the broadcasting channel of the content. UPnP AV CDS defines the attribute information that should be added for each type of object. Furthermore, in UPnP AV CDS, a server application or a vendor define unique attribute information, and a mechanism for adding such unique attribute information is defined. Therefore, in the data transmitting apparatus 101, the sever application executed on the data transmitting apparatus 101 is capable of adding attribute information defined in UPnP AV CDS or DLNA, and unique attribute information of the server application.

In the present embodiment, ocap:PresentationPoint, which is an attribute indicating a resume position that can be recognized by both the server application and the client application, is set as unique attribute information. It is to be noted that, in ocap:PresentationPoint, "ocap" is a prefix indicating XML namespace, and PresentationPoint indicates an element of XML. In the present embodiment, "ocap" indicates a namespace whose namespace URI is "urn:schemas-opencable-com". Refer to the XML namespace Specification published by the World Wide Web Consortium with regard to XML namespace.

Here, description about the process from when multimedia data is transmitted up to when transmission is paused in the communication between the data transmitting apparatus 101 and the data receiving apparatus 102 shall be made, then description shall be made using the example that the resumption of the transmission of the multimedia data that was paused during the transmission to the data receiving apparatus 102 is performed in the communication between the data transmitting apparatus 101 and the data receiving apparatus 103.

FIG. 23 is a diagram showing an example of the sequence regarding the obtainment of multimedia data and updating of content attribute information between the data transmitting apparatus 101 and the data receiving apparatus 102 and data receiving apparatus 103. In FIG. 23, the same process is performed for identical numerical references. It is to be noted that, when the data transmitting apparatus 101 and the data receiving apparatus 102 and data receiving apparatus 103 are connected to the network 104, each one performs communication defined in UPnP DA. With this, the data receiving apparatus 102 and the data receiving apparatus 103 can recognize that the data transmitting apparatus 101 is a server device (multimedia server) that is connected to the network 104. It is to be noted that, in addition, there may also be processes in which each of the data receiving apparatus 102 and the data receiving apparatus 103 advertises that it has joined the network, using the same method as with the data transmitting apparatus 101 described above, and the data transmitting apparatus 101 receives detailed information of the devices from the data receiving apparatus 102 and the data receiving apparatus 103, using the same method as with the data receiving apparatus 102 and the data receiving apparatus 103 described above.

The communication and the operations of the data transmitting apparatus 101 and the data receiving apparatus 102 in the stages up to the pausing of data transmission to the data receiving apparatus 102 in the data communication between the data transmitting apparatus 101 and the data receiving apparatus 102 shall be described with reference to FIG. 23. It is to be noted that the same operations are performed between the data transmitting apparatus 101 and the data transmitting apparatus 103.

When a new content is registered, the data transmitting apparatus 101 performs initialization by setting "−1" to the ocap:PresentationPoint which is resume position information indicating a resume position of a recorded content (2301). The data receiving apparatus 102 issues an obtainment request for a list of content attribute information to the data transmitting apparatus 101, using a CDS:Browse action in UPnP AV (2302). The data transmitting apparatus 101 transmits the list of content attribute information specified by the data receiving apparatus 102, to the data receiving apparatus 102 (2303). Here, when the ocap:PresentationPoint is the initial value "−1", the data transmitting apparatus 101 sends content attribute information in which the ocap:PresentationPoint, which is an element of content attribute information, is "−1". The data receiving apparatus 102 obtains, from the obtained content attribute information, the ocap:PresentationPoint indicating the resume position, and a Uniform Resource Locator (URL) needed to request a content file transmission (2304). When the ocap:PresentationPoint indicates the initial value, that is, when the ocap:PresentationPoint is "−1", the data receiving apparatus 102 issues a request for playing from the beginning of the content, since it can be judged that "playing currently paused" information is not set to the content. Furthermore, here, when a value is set to the ocap:PresentationPoint, the playing position is determined using a resume position identifier to be described later (2305). At this time, the data receiving apparatus 102 can notify all or part of the resume position and resume position identifier specified in the ocap:PresentationPoint to the client application, and the client application can set a playing position to the data receiving apparatus 102. The method for notifying the client application shall be described later. Of course, the data receiving apparatus 102 may determine the playing position based on the resume position and resume position identifier specified in the ocap:PresentationPoint, without notifying the client application.

Next, the data receiving apparatus 102 specifies the obtained URL and playing position, and requests for the transfer of multimedia data by using an HTTP GET request (2306). An example of a data transfer request is shown below. It is to be noted that, here, although a transfer range such as the transmission start position and the transmission end position is not specified because of starting the playing from the beginning of the content, the transfer range may be specified using a TimeSeekRange.dlna.org header and so on even when playing from the beginning of the content.

<Request for Transfer of Data from the Beginning of the Content>
GET http://192.168.0.3/AVData/0001.m2ts HTTP/1.1
Host: 192.168.0.3
Date: Fri Mar 06 20:00:00 2009 GMT
User-Agent: AVT Client
Connection: Keep-Alive The data transmitting apparatus 101 receives such a data transfer request and performs the specified data transfer, thereby enabling the data receiving apparatus 102 to start viewing (2307).

<Response to the Content Data Transfer Request>
HTTP/1.1 200 OK
Date: Fri Mar 06 20:00:00 2009 GMT
Server: AVT Server
Connection: Keep-Alive
Content-Type: video/mpeg
Content-Length: 3460361276 byte
(Empty Line)
[3460361276-byte data]

Next, when the playing is paused at the data receiving apparatus 102 (2308), the data receiving apparatus 102 ends the data reception and cuts off the connection with the data transmitting apparatus 101. At this time, the data receiving apparatus 102 requests for the updating of the resume position to the data transmitting apparatus 101, using CDS:UpdateObject, as necessary (2309). In this case, the CDS:UpdateObject adopts, as arguments, a content identifier (ObjectID) for changing the resume position, the ocap:PresentationPoint before updating, and the updated ocap:PresentationPoint. As an example, the details of a CDS:UpdateObject in the case where the playing by the data receiving apparatus 102 is stopped at a position 30 minutes past the beginning of the content, and 00:30:00 is specified as the resume position in the updated ocap:PresentationPoint is shown below. It is to be noted that, for the content identifier and the ocap:PresentationPoint before updating, the content attribute information obtained through the CDS:Browse is used. Here, an example is shown below for a case where the content identifier is "ContentID00" and the ocap:PresentationPoint before updating is "−1", and the ocap:PresentationPoint is to be updated to "00:30:00".

<[1] Example for a Resume Position Update Request>
CDS: UpdateObject(ContentID00,
"<ocap:PresentationPoint>−1</ocap:PresentationPoint>",
"<ocap:PresentationPoint>00:30:00</ocap:PresentationPoint>");

It is to be noted that although, in the present embodiment, the ocap:PresentationPoint is set to "−1" when the resume position is the initial value, any format is acceptable as long as it is one that can be recognized as being not-set, such as a blank element or the NULL character.

Furthermore, the data receiving apparatus 102 can set resume position information indicating in combination the resume position and a resume position identifier for identifying the resume position. Information unique to the receiving apparatus (Friendly Name, UUID, Port Number, IP address, and so on), information unique to the client application that runs on the data receiving apparatus (organization_id and application_id which are Java program identifiers described in AIT to be described later, or group_identifier which is an identifier for each group when, as an Addressable XAIT, an application is grouped into several addressing groups, and which are defined by the OCAP Specifications or DVB-MHP Specifications), a resume position identifier set by the client application to the data receiving apparatus (information that can be obtained by the client application from a user, and the like, through a user interface, and the like, such as placement location information, user information, or an application-distinguishable ID and the like, for example), or a date and time are available as examples of the resume position identifier. The data receiving apparatus 102 can set, as the resume position identifier for starting playing, information held by the data receiving apparatus 102 or information set by the client application that runs on the data receiving apparatus 102. It is to be noted that the method for setting the resume position identifier from the client application shall be described later.

Furthermore, the setting of the resume position identifier may be added by the data transmitting apparatus 101 upon receiving an update request for the ocap:PresentationPoint from the data receiving apparatus 102 and the data receiving apparatus 103. As an example, there is a method of using the date and time at which the data transmitting apparatus 101 receives the ocap:PresentationPoint update request as the resume position identifier, or it is possible to identify the data receiving apparatus that transmitted the update request and use the device information obtained from such data receiving apparatus to set, as the resume position identifier, information of the data receiving apparatus (information unique to the data receiving apparatus such as Friendly Name, UUID, IP address, MAC address, information unique to the client application that runs on the data receiving apparatus such as organization_id and application_id, or the like).

Examples of when the data receiving apparatus 102 associates the resume position and the resume position identifier and requests for the updating of resume position information included in content attribute information is shown below.

The data receiving apparatus 102 can set the resume position and the resume position identifier set by the data receiving apparatus 102 (hereafter called apparatus-set identifier) in association with each other. The apparatus-set identifier is information held by the data receiving apparatus 102 itself. Friendly Name, UUID, MAC address, IP address, and so on, are available as examples. Here, an example is shown in which the Friendly Name of the data receiving apparatus 102 is used as the apparatus-set identifier. It is to be noted that Friendly Name is defined in UPnP DA, and is for setting a name for the user to identify a device easily. UPnP DA does not define what kind of name should be set as a Friendly Name. As such, the Friendly Name is set according to strategies that differ depending on respective manufacturers or models. In the present embodiment, a Java application sets a Friendly Name to the data receiving apparatus 102, the data receiving apparatus 103, and the data transmitting apparatus 101, according to a method described later, thereby enabling uniformity in the strategy for setting a Friendly Name to each device in the home network. An example is shown below for an update request (CDS:UpdateObject) in the case where a placement location is specified as a Friendly Name (friendly_name).

<[2] Example 1 for Resume Position and Apparatus-Set Identifier Update Request:
apparatus-set identifier=Friendly Name (for example: "Living_Room")>
CDS: UpdateObject(ContentID00,
"<ocap:PresentationPoint>−1</ocap:PresentationPoint>",
"<ocap:PresentationPoint friendly_name="LivingRoom">00:30:00</ocap:PresentPoint>");

Next, another example is shown for the case where the data receiving apparatus 102 sets the resume position and the resume position identifier. The data receiving apparatus 102 can obtain information of the client application (hereafter called application information) that runs on the data receiving apparatus 102. As application information, there is defined in the OCAP Specification, for example, the organization_id (org_id) or the application_id (app_id), or the group_identifier when several applications are grouped. Any one of such application information or a combination thereof can be used as an apparatus-set identifier. The data receiving apparatus 102 can use a resume position having a resume position identifier with the same value as the application information. Furthermore, the data transmitting apparatus 101 can perform the updating of content attribute information according to UPnP AV CDS, only for an update request for the resume position having a resume position identifier with the same value as the application information. By using the application information in this manner, it becomes possible to limit the devices or applications requesting for the use or update of a resume position, and thus there is the effect that security is improved.

<[3] Example 2 for Resume Position and Apparatus-Set Identifier Update Request Example 2:
apparatus-set identifier=application information>
CDS: UpdateObject(ContentID00,
"<ocap:PresentationPoint>−1</ocap:PresentationPoint>",
"<ocap:PresentationPoint app_id="1", org_id="3">00:30:00</ocap:PresentationPoint>");

In addition, another example is shown for the case where the data receiving apparatus 102 sets the resume position and the resume position identifier. Here, the client application that runs on the data receiving apparatus 102 sets the resume position identifier to the data receiving apparatus 102 according to a method to be described later. Here, an example is shown for the case where "UserName" is set as the resume position identifier that is set by the client application (hereafter called application-set identifier). It is to be noted that, although "UserName" is used here as the application-set identifier, other information is also acceptable as long as it is a resume position identifier that is set by a downloaded application.

<[4] Example for Resume Position and Application-Set Identifier Update Request:
apparatus-set identifier=UserName (for example: "John")>

CDS: UpdateObject(ContentID00,
"<ocap:PresentationPoint>-1</ocap:PresentationPoint>",
"<ocap:PresentationPoint Identifier="John">00:30:00</ocap:PresentationPoint>");

In addition, another example is shown for the case where the data receiving apparatus 102 sets the resume position and the resume position identifier. Here, the apparatus-set identifier and the application-set identifier are combined and managed as the resume position identifier of the resume position. Here, an example is shown for the case where application information is set as the apparatus-set identifier in addition to the application-set identifier, so that it is possible to judge what kind of client application has set the resume position identifier when the application-set identifier set by the client application that runs on the data receiving apparatus 102 is used.

<[5] Example for Resume Position, Apparatus-Set Identifier, and Application-Set Identifier Update Request:
apparatus-set identifier=application information, application-set
Identifier=UserName (for example: "John")>
CDS: UpdateObject(ContentID00,
"<ocap:PresentationPoint>-1</ocap:PresentationPoint>",
"<ocap:PresentationPoint app_id="1", org_id="3",
Identifier="John">00:30:00</ocap:PresentationPoint>");

In addition, an example is shown below in which the type of the resume position identifier and the resume position identifier are described as attributes.
CDS: UpdateObject(ContentID00,
"<ocap:PresentationPoint>-1</ocap:PresentationPoint>",
"<ocap:PresentationPoint identifier_="UserName",
identifier="John">
00:30:00</ocap:PresentationPoint>");

It is to be noted that although a method in which the resume position identifier is described as an attribute is exemplified in the CDS:UpdateObject shown here, any format is acceptable as long as the association between the resume position and the resume position identifier can be recognized. As an example of another description method, a method which uses a Comma Separated Value (CSV) list as the ocap:PresentationPoint, and divides the resume position identifier using a comma "," after the resume position is shown below.
<Additional Example For Resume Position Identifier UserName (for Example: "John")>
CDS: UpdateObject(ContentID00,
"<ocap:PresentationPoint>-1</ocap:PresentationPoint>",
"ocap:PresentationPoint>00:30:00,john
</ocap:PresentationPoint>");

Furthermore, the apparatus-set identifier may be set as an attribute and the application-set identifier may be set in the ocap:PresentationPoint by using a CVS list. Following this configuration, <[5] Example for resume position, apparatus-set identifier, and application-set identifier update request> is as shown below.
CDS: UpdateObject(ContentID00,
"<ocap:PresentationPoint>-1</ocap:PresentationPoint>",
"<ocap:PresentationPoint app_id="1", org_id="3">00:30:00,
John</ocap:PresentationPoint>");

Furthermore, an example of the CDS:UpdateObject in the case where plural ocap:PresentationPoint are to be updated is shown below. Plural attribute values are set to respective ocap:PresentationPoint before updating and updated ocap:PresentationPoint, using the CSV list. In addition, in the ocap:PresentationPoint before updating and updated ocap:PresentationPoint, updating is performed in the order described in the CSV list.

CDS: UpdateObject(ContentID00,
"<ocap:PresentationPoint User Name="John">
00:15:00</ocap:PresentationPoint>,
<ocap:PresentationPoint UserName="Bob">
00:45:00</ocapPresentationPoint>",
"<ocap:PresentationPoint UserName="John">00:30:00
</ocap:PresentationPoint>");

Here, the above example means that the resume position "00:15:00" of the resume position identifier "John" is changed to the resume position "00:30:00" of the resume position identifier "John", and the resume position "00:45:00" of the resume position identifier "Bob" is deleted.

Furthermore, in the setting of plural ocap:PresentationPoint, pairs of a resume position and a resume position identifier may be set using the CSV list.
CDS: UpdateObject(ContentID00,
"<ocap:PresentationPoint>00:30:00,John</ocap:presentationPoint>",
"<ocap:PresentationPoint>00:30:00,John,00:45:00,Bob
</ocap:PresentationPoint>");

Although only the resume position "00:30:00" of the resume position identifier "John" is set before updating in the above example, in addition to this, the resume position "00:45:00" of the resume position identifier "Bob" is added.

It is to be noted that with respect to the UpdateObject description methods exemplified thus far, it is also acceptable to have a combination of these methods as long as the resume position and the resume position identifier can be associated with each other.

As shown in FIG. 23, upon receiving the CDS:UpdateObject, the data transmitting apparatus 101 updates the content attribute information corresponding to the specified content identifier (2310), and transmits the update result to the data receiving apparatus 102 (2311). Specifically, in step 2310, in order for the updated resume position information (ocap:PresentationPoint) to be included in the stored content attribute information, the data transmitting apparatus 101 updates such content attribute information. It is to be noted that, with regard to the setting of the resume position identifier, the data transmitting apparatus 101 may add a resume position identifier associated with a resume position, when it receives a CDS:UpdateObject from the data receiving apparatus 102 and the data receiving apparatus 103. As an example, there is the method of using the date and time at which the data transmitting apparatus 101 receives the ocap:PresentationPoint update request as the resume position identifier, or it is possible to identify the data receiving apparatus that transmitted the update request and set, as the resume position identifier, information of such data receiving apparatus (information unique to the data receiving apparatus such as Friendly Name, UUID, IP address, MAC address, information unique to the client application that runs on the data receiving apparatus such as organization_id and application_id, or the like).

Upon receiving the CDS:UpdateObject, the data transmitting apparatus 101 updates the resume position and the resume position identifier of the content having the object identifier "ContentID00". It is to be noted that the method with which the data transmitting apparatus 101 deletes the resume position and the resume position identifier of the content may be (1) a method in which the resume position and the resume position identifier are deleted upon receiving a delete request from the data receiving apparatus to be described later, (2) a method in which the start position of data transfer is checked when a data transfer request is received from a certain data receiving apparatus in the home network, and in the case where a data transfer starting from a position matching the resume position managed using ocap:PresentationPoint is requested, the matching resume position and the resume position identifier are deleted, (3) a method in which a pair of a resume position and a resume position identifier for which resumption has not been performed for a specific period is automatically deleted by the data transmitting apparatus 101, or the like.

Furthermore, the data transmitting apparatus 101 notifies the updating of the CDS to the data receiving apparatus that transmitted the CDS update request (2312). The method for update notification is a publicly known technique defined in the UPnP Specification. Refer to the UPnP Specification for details.

Next, description shall be made regarding the operation of resuming transmission of multimedia data that was paused by the data receiving apparatus 102, in the communication between the data transmitting apparatus 101 and the data receiving apparatus 103.

As with the data receiving apparatus 102, the data receiving apparatus 103 issues an obtainment request for a list of content attribute information to the data transmitting apparatus 101, using a CDS:Browse action in UPnP AV (2302). The data transmitting apparatus 101 transmits the list of content attribute information specified by the data receiving apparatus 103 (2303).

FIG. 24 is a diagram showing an example of the list of content attribute information specified by the data receiving apparatus 103. For example, after the data transmitting apparatus 101 receives the aforementioned <[1] Example for a resume position update request>, the part of the content attribute information received by the data receiving apparatus 103 as a CDS:Browse response is exemplified by 2401 in FIG. 24. It is to be noted that, in <[1] Example for a resume position update request>, the data receiving apparatus 102 does not set the resume position identifier, and in 2401 in FIG. 24, the data transmitting apparatus 101 adds, as the resume position identifier, the date and time at which the request is received.

Furthermore, the case where the data receiving apparatus 103 transmits a CDS:Browse action after the data transmitting apparatus 101 receives, from the data receiving apparatus 102, an UpdateObject as shown below, shall be taken into consideration.
CDS: UpdateObject(ContentID00,
"<ocap:PresentationPoint>00:30:00, LivingRoom, 00:45:00,
Tom'sRoom
</ocap:PresentationPoint> 00:30:00, LivingRoom, 00:45:00,
Tom'sRoom, 00:20:00
Kitchen </ocap:PresentationPoint>");

FIG. 25 is a diagram showing another example of content attribute information specified by the data receiving apparatus 103. The part of the content attribute information which is included in the CDS:Browse response and has plural resume positions and resume position identifiers, in a case such as that described above, is exemplified as in 2501 in FIG. 25.

It is to be noted that, although ocap:PresentationPoint is exemplified as being details of a desc element in accordance with the UPnP AV Specification, other XML description methods are also acceptable as long as the resume position and the resume position identifier can be represented.

The data receiving apparatus 103 obtains, from the obtained content attribute information, the ocap:Presentation Point indicating the resume position, and URL needed to request a content file transmission (2304). The data receiving apparatus 103 obtains the resume point identifier and the resume point from the ocap:PresentationPoint, notifies these to the client application, and determines the playing position by having the client application set the resume position (2305). The method for notifying the application shall be described later. It is to be noted that, the data receiving apparatus 103 may determine the playing position based on the resume position and resume position identifier specified in the ocap:Presentation Point, without notifying the client application.

It is to be noted that, when using the application identifier defined in the OCAP Specification as the resume position identifier, it is acceptable to notify, to the client application, only the resume position information having the same application identifier as the client application that runs on the data receiving apparatus 103. As an example, in the case where the organization_id and the application_id of the client application are identical to the resume position identifier, it can be judged that the same application has performed the setting, and thus it may be judged that such client application can use the resume position, application-set identifier, or the like. Furthermore, in the case where the organization_id is identical, the organization which created the application is the same, and thus it may be judged that the resume position, the application-set identifier, or the like, can be used. In this manner, whether or not to use the resume position or the application-set identifier may be determined through any of the application information or a combination thereof. In this case, it becomes possible to limit the applications which use or update the resume position, and thus there is the effect of improved security, and so on.

Next, the data receiving apparatus 103 specifies the obtained URL and playing position, and requests for the transfer of multimedia data through an HTTP GET request (2306). As an example of a data transfer request, an example in which the requested playing range is specified using TimeSeekRange.dlna.org is shown below.
<Content Data Transfer Request>
GET http://192.168.0.3/AVData/0001.m2ts HTTP/1.1
Host: 192.168.0.3
Date: Fri Mar 06 20:00:00 2009 GMT
User-Agent: AVT Client
Connection: Keep-Alive
TimeSeekRange.dlna.org: ntp=00:30:00-01:25:00

The data transmitting apparatus 101 receives such a data transfer request and performs the specified data transfer, thereby enabling the data receiving apparatus 103 to start viewing (2307).
Response To The Content Data Transfer Request>
HTTP/1.1 200 OK
Date: Fri Mar 06 20:00:00 2008 GMT
Server: AVT Server
Connection: Keep-Alive
Content-Type: video/mpeg
Content-Length: 3460361276
TimeSeekRange.dlna.org:
ntp=00:30:00-01:25:00/01:55:00bytes=1887436904-5347798180/7235175300
(Empty line)
[34603061276-byte data]

Next, when the viewing is paused by the user at the data receiving apparatus 103 (2308), the data receiving apparatus 103 ends the data reception, and cuts off the connection with the data transmitting apparatus 101. At this time, the data receiving apparatus 103 requests the updating of the resume position to the data transmitting apparatus 101, using CDS: UpdateObject, if necessary (2309). Specifically, the data receiving apparatus 103 requests for the resume position to be updated to the position in the content at which playing was stopped (playing stop position).

With the resume position update request, it is possible to (1) delete the resume position and the resume position identifier, (2) add a new resume position and resume position identifier, and (3) change a resume position associated with a particular resume position identifier. Hereinafter, the CDS: UpdateObject in the case where Friendly Name is used as the resume position identifier is shown as examples for (1) and (2), and the CDS:UpdateObject in the case where UserName is used as the resume position identifier is shown as an example for (3). The methods for deleting, updating, and adding a resume position and a resume position identifier are not dependent on the resume position identifier. Updating can be implemented by replacing the ocap:PresentationPoint before updating with the updated ocap:PresentationPoint.

(1) Example for Deletion of Resume Position and Resume Position Identifier

For example, in the case where the viewing of a content is completed at the data receiving apparatus 103, the deletion of the resume position can be assumed. Here, the data receiving apparatus 103 transmits a CDS:UpdateObject for deleting the resume position to the data transmitting apparatus 101, and deletes the information of the resume position.
<Example for Deletion of Resume Position>
CDS: UpdateObject(ContentID00,
"<ocap:PresentationPoint
   friendly_name="LivingRoom">00:30:00
</ocap:PresentationPoint>", Upon receiving such request, the data transmitting apparatus 101 deletes the corresponding ocap:PresentationPoint. At this time, in the case where there is no ocap:PresentationPoint other than the ocap:PresentationPoint for which deletion is requested, the data transmitting apparatus 101 deletes the corresponding ocap:PresentationPoint and adds an ocap:PresentationPoint having the initial value "−1".

It is to be noted that although the deletion of the corresponding ocap:PresentationPoint is performed in this example, it is also acceptable to send a request for updating the value of the corresponding ocap:PresentationPoint to the initial value "−1" and have the data transmitting apparatus 101 judge whether to delete such ocap:PresentationPoint or to replace it with an ocap:PresentationPoint having the initial value "−1".

(2) Example for Changing of Resume Position and Resume Position Identifier

For example, in the case where, after continuing the viewing from the data receiving apparatus 102 at the data receiving apparatus 103, the playing of the content is again paused at the data receiving apparatus 103, the deletion of the old resume position identifier and the addition of a new resume position identifier can be assumed. An example is shown below in which the resume position "00:30:00" and the resume position identifier "friendly_name="LivingRoom"" are deleted at the data receiving apparatus 102, and a new paused resume position "00:45:00" and resume position identifier "friendly_name="John'sRoom"" are added at the data receiving apparatus 103.
<Example for Changing of Resume Position>
CDS: UpdateObject(ContentID00,
"<ocap:PresentationPoint
   friendly_name="LivingRoom">00:30:00
</ocap:PresentationPoint>",
"<ocap:PresentationPoint
   friendly_name="John'sRoom">00:45:00
</ocap:PresentationPoint>");

(3) Example for Changing a Resume Position Associated with a Particular Resume Position Identifier.

For example, in the case where the user is used as the resume position identifier, it can be assumed that, regardless of the data receiving apparatus at which the pausing and resumption of viewing is performed, the resume position identifier remains the same and only the resume position is updated. In the example below, "UserName="John"" remains the same, and only the resume position is updated.
<Example for Changing a Resume Position Associated with a Resume Position Identifier>
CDS: UpdateObject(ContentID00,
"<ocap:PresentationPoint UserName="John">00:30:00
</ocap:PresentationPoint>",
"<ocap:PresentationPoint UserName="John">00:45:00
</ocap:PresentationPoint>");

Upon receiving the CDS:UpdateObject, the data transmitting apparatus 101 updates the content attribute information corresponding to the specified content identifier (2310), and transmits the update result to the data receiving apparatus 102 (2311). It is to be noted that, in the case where the data transmitting apparatus 101 stores the application identifier and the resume position in association with each other as resume position information, the resume position information may have an application identifier (for example, any one of organization_id, application_id, and group_id, or a combination thereof) that is the same with that of the client application that runs on the data receiving apparatus issuing the resume position update request. Alternatively, it is also acceptable to have a configuration in which the resume position is updated in the case where permission to update the resume permission information is granted, and the resume position is not updated in all other cases. In this case, it becomes possible to apply a limit to the data receiving apparatuses or the client applications which perform the updating of the resume position, and thus there is the effect that unintended updating by the user can be prevented.

Furthermore, the data transmitting apparatus 101 notifies the updating of the CDS to the data receiving apparatus that transmitted the CDS update request (2312).

As described above, in the multimedia delivery system 107 configured of the data transmitting apparatus 101, the data receiving apparatus 102, the data receiving apparatus 103, the network 104, the broadcast station 105, and the cable 106 in the present invention, for example, even when the viewing of a content performed at the data receiving apparatus 102 is paused, the viewing can be properly resumed at the other data receiving apparatus 103.

Hereinafter, the data transmitting apparatus 101, the data receiving apparatus 102, and the data receiving apparatus 103 included in the multimedia delivery system 107 in the present invention shall be described in more detail.

First, the data transmitting apparatus 101 shall be described.

Figure 2:
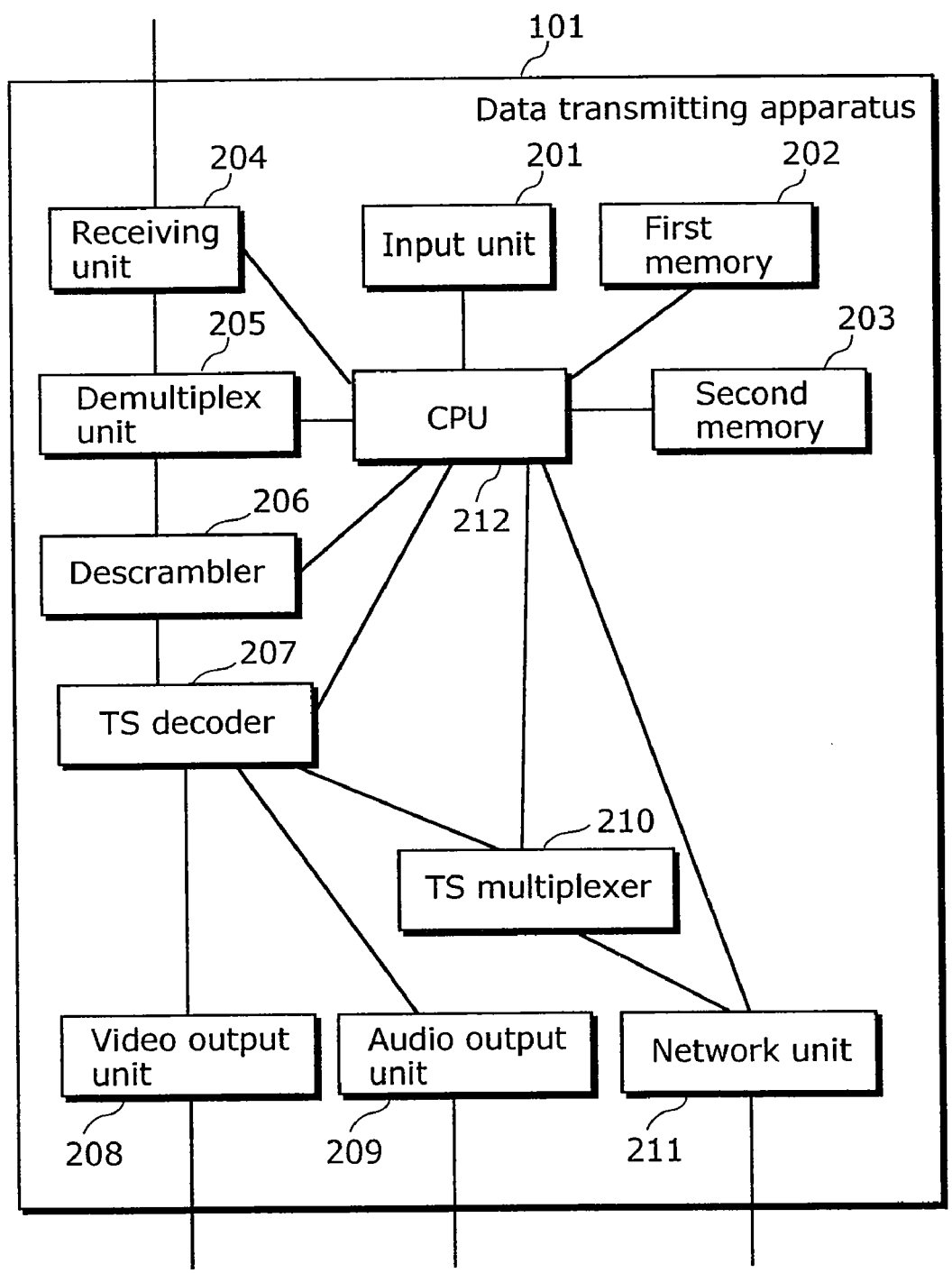
FIG. 2 is a configuration diagram for the data transmitting apparatus 101 in the embodiment of the present invention.

FIG. 2 is a block diagram showing the relationships among the constituent elements included in the data transmitting apparatus 101 in the present embodiment. The data transmitting apparatus 101 includes an input unit 201, a first memory 202, a second memory 203, a receiving unit 204, a demultiplex unit 205, a descrambler 206, a TS decoder 207, a video output unit 208, an audio output unit 209, a TS multiplexer 210, a network unit 211, and a CPU 212.

The input unit 201 is configured of a front panel, remote control light receiver, and the like, and receives an instruction such as a channel selection from a user, and the like.

Figure 3:
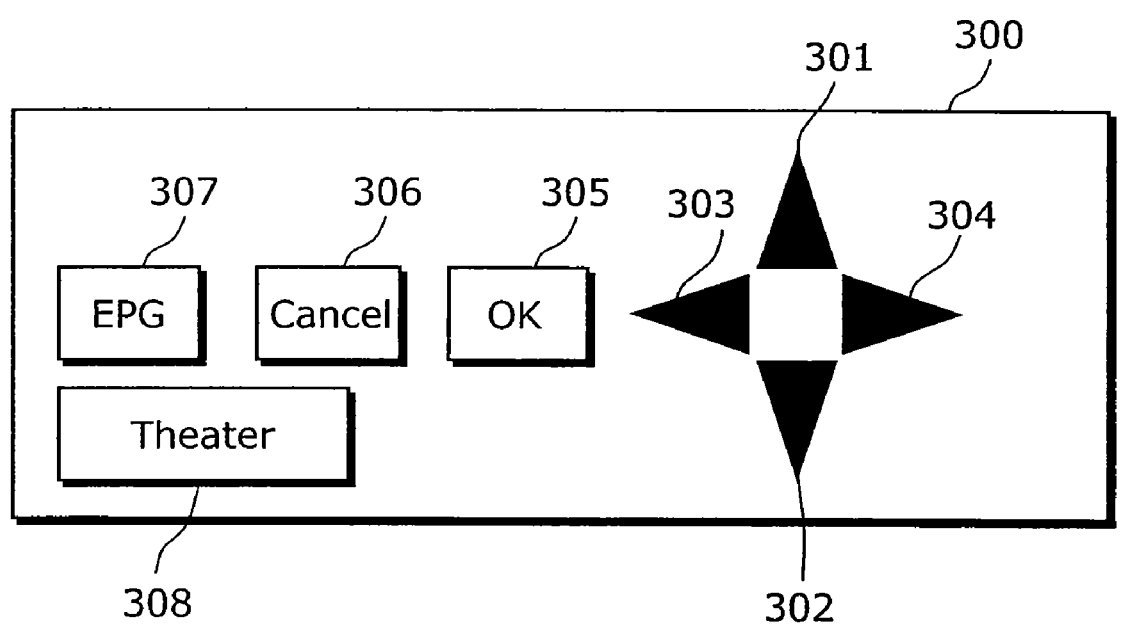
FIG. 3 is a diagram showing an example of an external view in the case where the input unit 201 in the embodiment of the present invention is made up of a front panel.

FIG. 3 is a diagram showing an example of the input unit 201 in the case where it is configured of a front panel. A front panel 300 includes 8 buttons, namely, an up-cursor button 301, a down-cursor button 302, a left-cursor button 303, a right-cursor button 304, an OK button 305, a cancel button 306, an EPG button 307, and a theater button 308. When the user presses down a button, the identifier of such pressed button is notified to the CPU 212.

The first memory 202 is configured of a RAM, or the like, and is used when the CPU 212 temporarily stores data.

The second memory 203 is configured of a device that can hold information even when power is turned off, such as a flash memory, a hard disk, or the like, and stores a program executed by the CPU 212. For the second memory 203, a detachable storage device such as an SD memory card and the like may also be used.

The receiving unit 204 is connected to the cable from a CATV station from which it receives broadcast waves. The receiving unit 204 tunes to the frequency specified by the CPU 212, extracts an MPEG transport stream, and passes the extracted MPEG transport stream to the demultiplex unit 205.

The demultiplex unit 205 receives the MPEG transport stream from the receiving unit 204, extracts information specified by the CPU 212 and passes it to the CPU 212. In addition, it passes the MPEG transport stream to the descrambler 206 as it is.

The descrambler 206 descrambles (=decrypts) the scrambled MPEG transport stream provided by the demultiplex unit 205, and passes the descrambled MPEG transport stream to the TS decoder 207. The descrambler 206 may be a module built-into the data transmitting apparatus 101, and may also be implemented through the CableCARD™ introduced in North American cable receivers. The specifications of CableCARD are described in the CableCARD Interface Specification laid out by the CableLabs in the United States, and thus description is omitted herein.

The TS decoder 207 receives, from the CPU 212, identifiers of audio data, video data, and section data such as PSI/SI information and so on In addition, the TS decoder 207 extracts, from the descrambled stream received from the descrambler 206, data corresponding to the received identifiers of audio data, video data, and section data such as PSI/SI information and so on, and passes the extracted video data to the video output unit 208, and the audio data to the audio output unit 209. Furthermore, the TS decoder 207 passes both the extracted video data and audio data, as well as the section data, to the TS multiplexer 210.

The video output unit 208, which includes a video output terminal, converts the received video data into video data that complies with the video output terminal and outputs the converted video data. An example of the video output terminal is a composite cable terminal, and so on.

The audio output unit 209, which includes an audio output terminal, converts the received audio data into audio data that complies with the audio output terminal and outputs the converted audio data. Examples of the audio output terminal are earphone terminals, the composite cable terminal, and so on.

The TS multiplexer 210 generates an MPEG-2 transport stream from the received video data, audio data, and section data, and passes the MPEG-2 transport stream to the network unit 211. The PSI/SI information can be rewritten as necessary.

The network unit 211, which includes a network interface, converts the data received from the CPU 212 into a signal that is in accordance with the physical media of the network to which the network interface is connected to, and outputs this signal. Furthermore, the network unit 211 receives a signal from the network interface, converts the signal into a packet defined by the IP network, and passes the packet to the CPU 212.

The CPU 212 controls the receiving unit 204, the demultiplex unit 205, the descrambler 206, the TS decoder 207, the TS multiplexer 210, and the network unit 211 by executing a program stored in the second memory 203.

Figure 4:
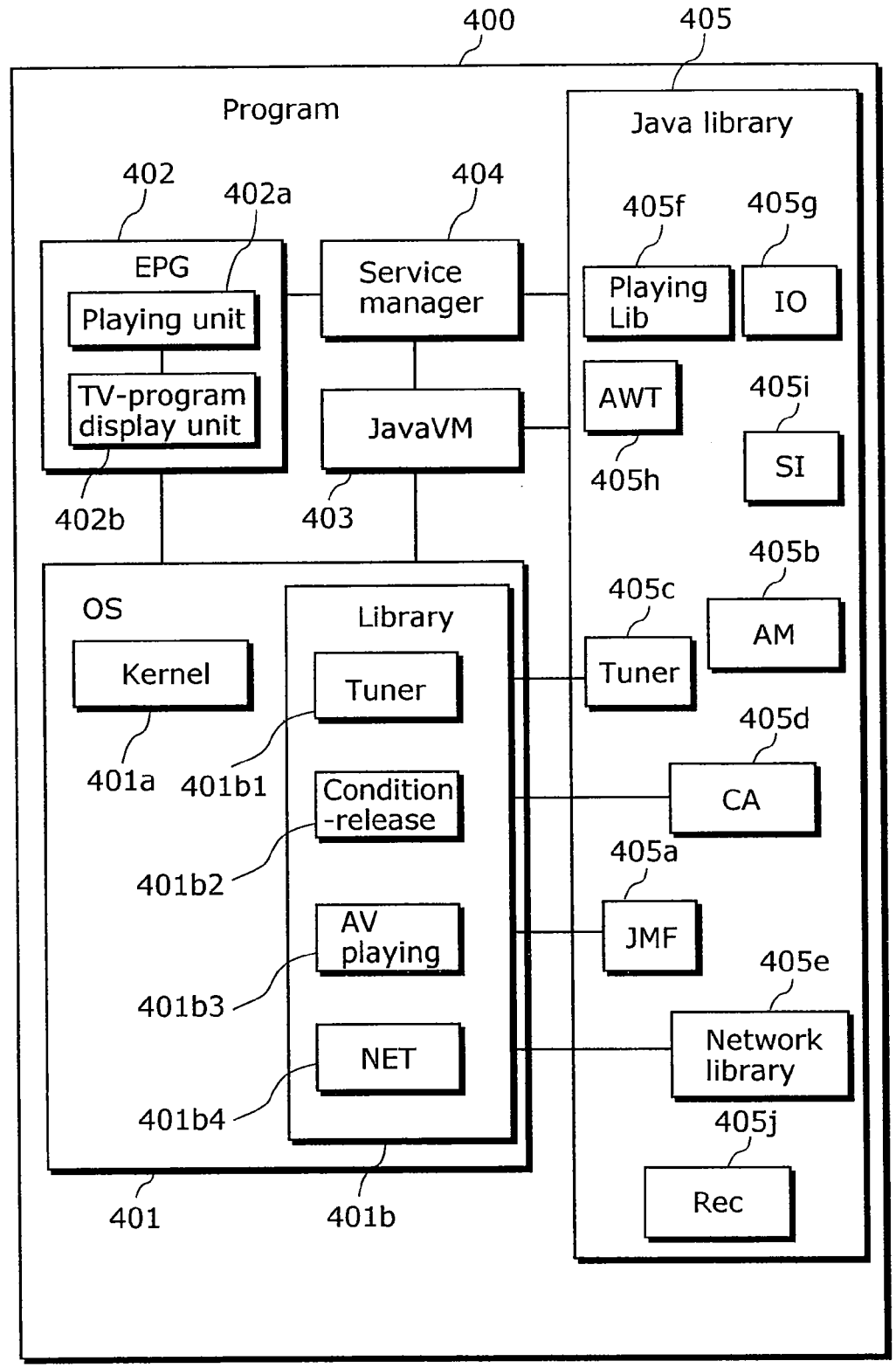
FIG. 4 is a structure diagram for a program stored by data the transmitting apparatus 101 in the embodiment of the present invention.

FIG. 4 is a structure diagram showing an example of the program stored in the second memory 203 and executed by the CPU 212.

A program 400 is made up of plural subprograms, and is specifically made up of an OS 401, an EPG 402, a Java VM 403, a service manager 404, and a Java library 405.

The OS 401 is a subprogram activated by the CPU 212 when power to the data transmitting apparatus 101 is turned on. OS is the is acronym for operating system, an example of which is Linux and the like. The OS 401 is a generic name for publicly known technology made up of a kernel 401a for executing a subprogram concurrently with another subprogram and of a library 401b, and therefore detailed description is omitted. In the present embodiment, the kernel 401a in the OS 401 executes the EPG 402 and the Java VM 403 as subprograms. Furthermore, the library 401b provides these subprograms with plural functions required for controlling the constituent elements held by the data transmitting apparatus 101.

In the present embodiment, the library 401b includes a tuner 401b1, condition-release 201b2, AV playing 401b3, and NET 401b4, as an example of functions.

The tuner 401b1 receives tuning information including a frequency from other subprograms or a Tuner 405c of the Java library 405, and passes the received tuning information to the receiving unit 204. The receiving unit 204 can perform demodulation based on the provided tuning information, and pass the demodulated data to the demultiplex unit 205. As a result, the other subprograms and the Tuner 405c of the Java library 205 can control the receiving unit 204 through the library 401b.

The condition-release 401b2 receives information from other subprograms or a CA 405d of the Java library 405, and passes the received information to the descrambler 206.

The AV playing 401b3 receives the audio packet ID and video packet ID from the other subprograms or a JMF 405a of the Java library 405. The AV playing 401b3 then provides the received audio packet ID and video packet ID to the TS decoder 207. As a result, the TS decoder 207 performs filtering based on the provided packet IDs, and implements the playing of video and audio.

The NET 401b4 creates packets of a protocol lower than the application layer defined by the IP network, for the data received from the other subprograms or a network library 405e of the Java library 405. A protocol lower than the application layer refers to, for example, a TCP packet, a UDP packet, an IP packet, and so on. By passing this to the network unit 211, messages and data are transmitted to another device via the network 104. Furthermore, when a message is received from another device via the network 104, the NET 401b4 converts the message to an application layer protocol packet and passes this packet to the other subprograms or the network library 405e of the Java library 405. An application layer protocol refers to, for example, Hypertext Transfer Protocol (HTTP), Real-time Transport Protocol (RTP), and so on.

The EPG 402 is made up of a TV-program display unit 402a for displaying a list of TV-programs to the user as well as for accepting an input from the user, and a playing unit 402b for selecting channels. Here, EPG is an abbreviation of Electric Program Guide. The EPG 402 is activated by the kernel 401a when power to the data transmitting apparatus 101 is turned on. Inside the activated EPG 402, the TV-program display unit 402a and the playing unit 402b are activated at the same time. When activated, the TV-program display unit 402a waits for an input from the user through the input unit 201 of the data transmitting apparatus 101. Here, in the case where the input unit 201 is configured of a front panel as shown in FIG. 3, when the user presses down the EPG button 307 of the input unit 201, the identifier of such EPG button is notified to the CPU 212. The TV-program display unit 402a of the EPG 402, which is a subprogram that runs on the CPU 212, accepts this identifier, then creates TV-program information display data, and displays this on a monitor 510 using a monitor output unit that is not shown in the figure. The monitor 510 may be included in the data transmitting apparatus 101, and may also be a television connected to the data transmitting apparatus 101 by a composite cable, High-Definition Multimedia Interface (HDMI) cable, or the like. The monitor 510 displays the received TV-program information display data.

Figure 5A:
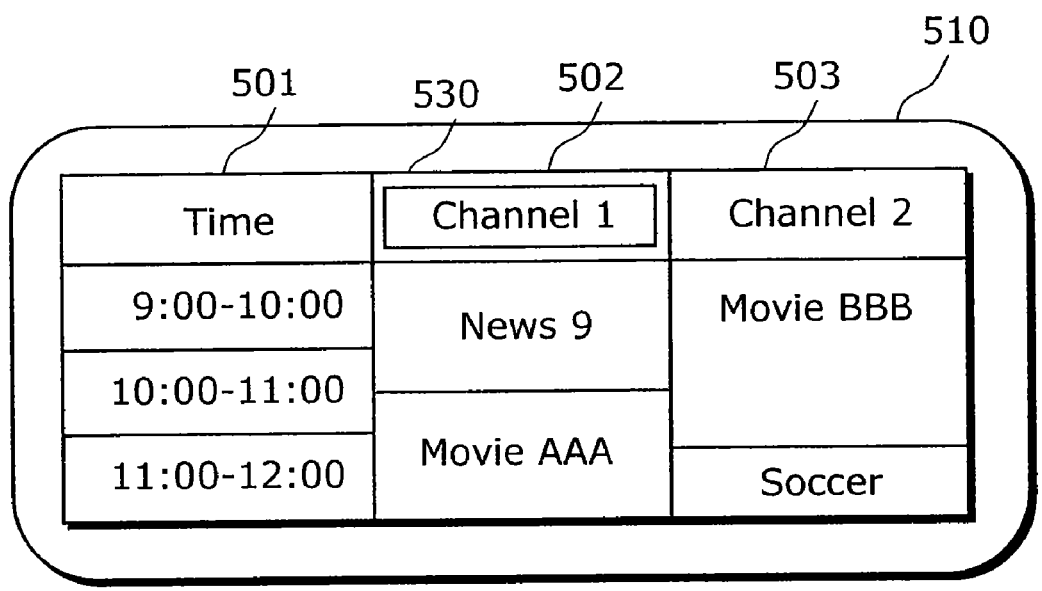
FIG. 5A is a diagram showing an example of an on-screen display in the embodiment of the present invention.
Figure 5B:
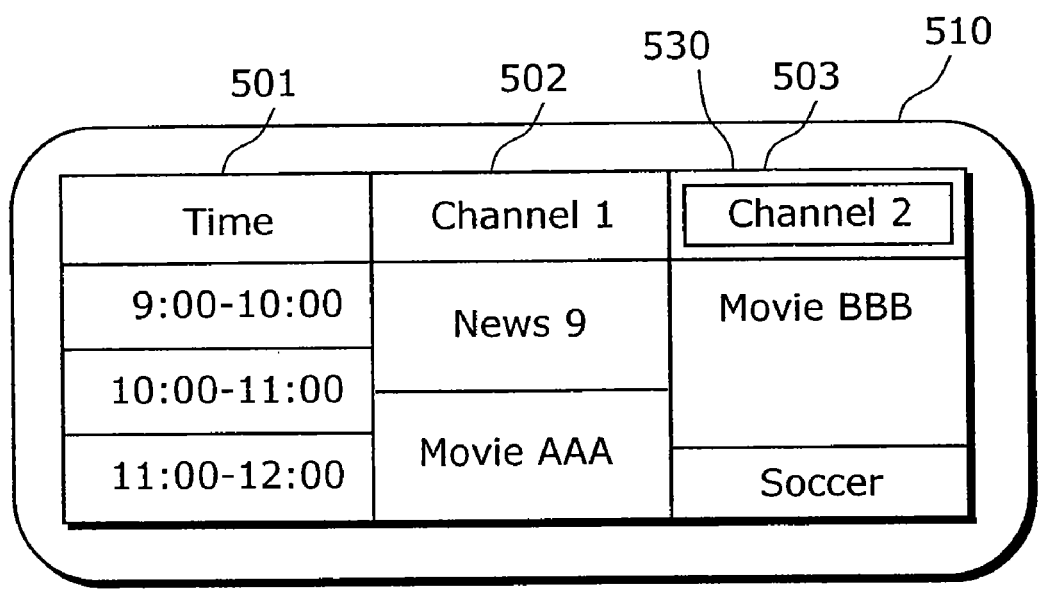
FIG. 5B is a diagram showing an example of an on-screen display in the embodiment of the present invention.

FIG. 5A and FIG. 5B are diagrams showing an example of a TV-program list displayed on the monitor 510. Referring to FIG. 5A, TV-program information is displayed on the monitor 510 in a grid pattern. A column 501 displays time information. A column 502 displays a channel name "Channel 1" and TV-programs to be broadcast during time ranges corresponding to the respective times described in the column 501. It is shown that, on "Channel 1", a TV-program "News 9" is broadcast from 9:00 to 10:30, and a TV-program "Movie AAA" is broadcast from 10:30 to 12:00. As in the case of the column 502, a column 503 displays a channel name "Channel 2" and TV shows to be broadcast during time ranges corresponding to the respective times described in the column 501. A TV show "Movie BBB" is broadcast from 9:00 to 11:00, and "News 11" is broadcast from 11:00 to 12:00. 530 is a cursor. The cursor 530 moves at the press of the left-cursor button 303 or the right-cursor button 304 on the front panel 300. When the right-cursor button 304 is pressed down in the state illustrated in FIG. 5A the cursor 530 moves towards the right as shown in FIG. 5B. Meanwhile, when the left-cursor button 303 is pressed down in the state illustrated in FIG. 5B, the cursor 530 moves towards the left as shown in FIG. 5A.

When the OK button 305 on the front panel 300 is pressed down in the state shown in FIG. 5A, the TV-program display unit 402a notifies the playing unit 402b of the identifier of the "Channel 1". When the OK button 305 on the front panel 300 is pressed down in the state shown in FIG. 5B, the TV-program display unit 402a notifies the playing unit 402b of the identifier of the "Channel 2".

Furthermore, through the demultiplex unit 205, the TV-program display unit 402a regularly stores in advance, in the second memory 203, TV-program information to be displayed. Generally, it takes time to obtain TV-program information from the broadcast station. It is possible to quickly display a TV-program table by displaying the TV-program information previously stored in the second memory 203, at the press of the EPG button 307 of the input unit 201.

Figure 6:
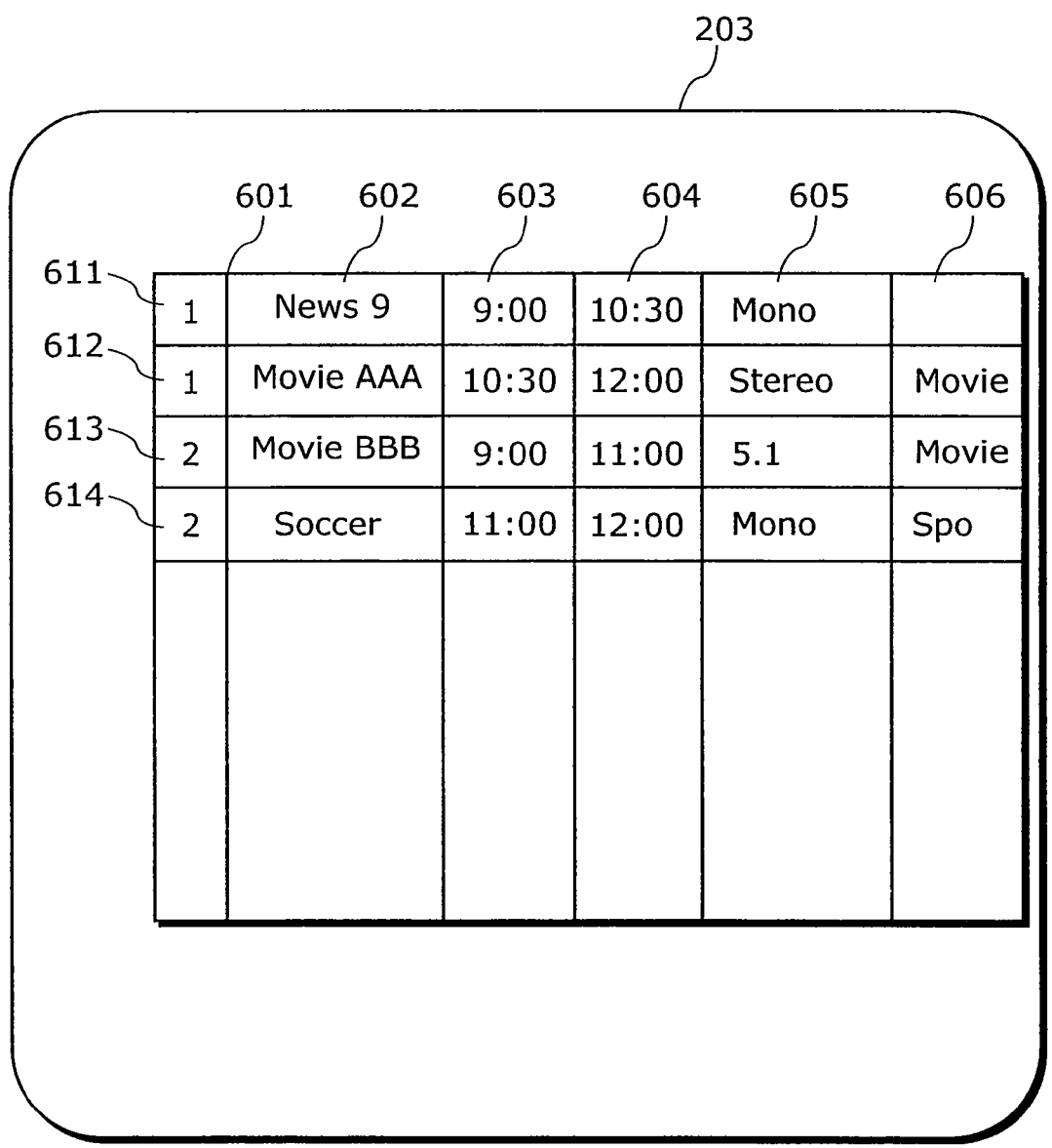
FIG. 6 is a diagram showing an example of TV-program information stored in the secondary storage unit 203 in the embodiment of the present invention.

FIG. 6 is a diagram showing an example of TV-program information stored in the second memory 203. The TV-program information is stored in tabular form. A column 601 describes the identifiers of channels. A column 602 describes TV-program names. A column 603 describes the broadcast start times of the TV-programs, and a column 604 describes the broadcast end times. A column 605 describes the audio type of the TV-programs, and indicates mono audio, stereo audio, and 5.1 channel audio as "mono", "stereo", and "5.1", respectively. A column 606 describes the type of the TV-programs. A regular TV-program is described as an empty cell, a movie is described as "movie", and a sports program is described as "spo". Each of rows 611 to 614 describes information for one TV-program. In this example, one TV-program information is the set of the channel identifier, TV-program name, broadcast start time, broadcast end time, and TV-program sound type. For example, the row 611 describes a set which includes "1" as the channel identifier, "news 9" as the TV-program name, "9:00" as the broadcast start time, "10:30" as the broadcast end time, "mono" as the sound-type, and "regular" as the TV-program type.

The playing unit 402b plays a channel using the received identifier of the channel. In other words, it plays the video and audio making up the channel. The relationship between channel identifiers and channels is pre-stored in the second memory 203 as channel information.

Figure 7:
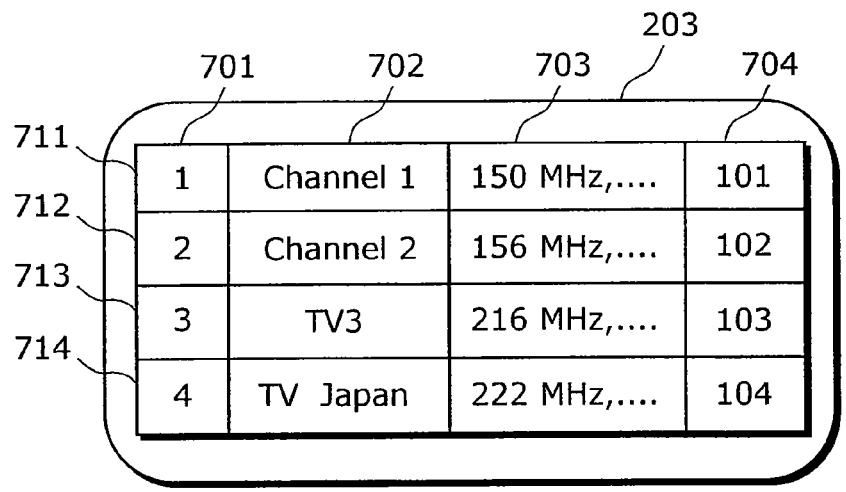
FIG. 7 is a diagram showing an example of channel information stored in the secondary storage unit 203 in the embodiment of the present invention.

FIG. 7 is a diagram showing an example of the channel information stored in the second memory 203. The channel information is stored in tabular form. A column 701 describes the identifiers of channels. A column 702 describes channel names. A column 703 describes tuning information. Here, the tuning information are values to be provided to the receiving unit 204, such as frequency, transmission rate, and coding ratio. A column 704 describes program numbers. Program numbers are numbers used to identify PMTs defined by the MPEG-2 standard. A description about PMT is given later. Each of rows 711 to 714 indicates a set of the identifier, channel name, and tuning information of each channel. The row 711 describes a set that includes "1" as an identifier, "Channel 1" as a channel name, a frequency of "150 MHz" as tuning information, and "101" as a program number. The playing unit 402b passes the received identifier of the channel directly to the service manager 404 in order to play the channel.

Moreover, when the user presses down the up-cursor button 301 or the down-cursor button 302 on the front panel 300 while the playing is taking place, the playing unit 402b receives a notification corresponding to the pressed cursor button from the input unit 201 through the CPU 212, and changes the channel being played accordingly. When the up-cursor button 301 is pressed down, a channel having the next lower channel identifier to that of the currently-played channel is played, and when the down-cursor button 302 is pressed down, a channel having the next higher channel identifier to that of the currently-played channel is played. First, the playing unit 402b stores, in the second memory 203, the identifier of the channel that is currently played.

Figure 8A:
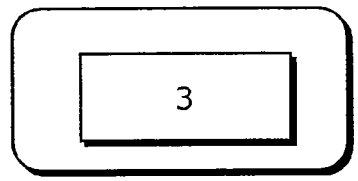
FIG. 8A is a diagram showing an example of a channel identifier stored in the secondary storage unit 203 in the embodiment of the present invention.
Figure 8B:
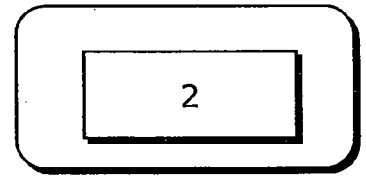
FIG. 8B is a diagram showing an example of a channel identifier stored in the secondary storage unit 203 in the embodiment of the present invention.
Figure 8C:
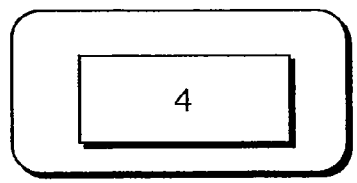
FIG. 8C is a diagram showing an example of a channel identifier stored in the secondary storage unit 203 in the embodiment of the present invention.

FIGS. 8A, 8B and 8C are diagrams showing example identifiers of channels stored in the second memory 203. FIG. 8A shows that an identifier "3" is stored, and by referring to FIG. 7, it is shown that a channel having the channel name "TV 3" is currently played. When the user presses down the up-cursor button 301 in a state illustrated in FIG. 8A, the playing unit 402b refers to the channel information shown in FIG. 7, and passes the identifier "2" of a channel with the channel name of "Channel 2" to the service manager 404 in order to switch playing to the channel with the channel name of "Channel 2" which is the channel having an identifier that is one value lower than that of the channel currently played. At the same time, the playing unit 402b rewrites the identifier stored in the second memory 203 to the channel identifier "2". FIG. 8B shows the state in which the channel identifier has been rewritten. Furthermore, when the user presses down the down-cursor button 302 in a state illustrated in FIG. 8A, the playing unit 402b refers to the channel information shown in FIG. 7, and passes the identifier "4" of a channel having the channel name of "TV Japan" to the service manager 404 in order to switch playing to the channel having the channel name of "TV Japan" which is the channel having an identifier which is one value higher than that of channel currently played. At the same time, the playing unit 402b rewrites the identifier stored in the second memory 203 to the channel identifier "4". FIG. 8B shows the state in which the channel identifier has been rewritten. The channel identifier is saved, even when power to the data transmitting apparatus 101 is cut-off, since it is stored in the second memory 203.

In addition, upon being activated when power to the data transmitting apparatus 101 is turned on, the playing unit 402b reads the channel identifier stored in the second memory 203. Then, the playing unit 402b passes such channel identifier to the service manager. With this, when power is turned on, the data transmitting apparatus 101 is able to start the playing of the last channel that was being played at the time of its previous operation.

The Java VM 403 is a Java virtual machine that sequentially analyzes and executes programs written in the Java™ language. Programs written in the Java language are compiled into intermediate codes known as byte codes which are not dependent on hardware. A Java virtual machine is an interpreter that executes such byte code. Some Java virtual machines pass the byte code to the CPU 212 after translating the byte code into an execution format which can be interpreted by the CPU 212, and executes it. The Java VM 403 is activated, with a Java program to be executed being specified by the kernel 401a. In the present embodiment, the kernel 401a specifies the service manager 404 as the Java program to be executed. Details of the Java language are described in many publications such as "Java Language Specification (ISBN 0-201-63451-1)". Here, such details are omitted. Furthermore, the detailed operation of the Java VM itself is described in many publications such as "Java Virtual Machine Specification (ISBN 0-201-63451-X)". Here, such details are omitted.

The service manager 404, which is a Java program written in the Java language, is sequentially executed by the Java VM 403. It is possible for the service manager 404 to call or be called by another subprogram not written in the Java language, through the Java Native Interface (JNI). The JNI is also described in many publications such as in the book "Java Native Interface" and so on. Here, such details are omitted.

First the process in the case of receiving a digital broadcast and playing the received multimedia data shall be described.

The service manager 404 accepts the identifier of a channel from the playing unit 402b, through the JNI.

The service manager 404 first passes the identifier of the channel to the Tuner 405c in the Java library 405, and requests for tuning. The Tuner 405c refers to the channel information stored in the second memory 203, and obtains the tuning information. Now, when the service manager 404 passes the identifier "2" of the channel to the Tuner 405c, the Tuner 405c refers to the column 712 shown in FIG. 7, and obtains the corresponding tuning information "156 MHz". The Tuner 405c passes the tuning information to the receiving unit 204 through tuner 401b1 of the library 401b in the OS 401. The receiving unit 204 performs demodulation on the signal transmitted from the broadcast station, based on the provided tuning information, and passes the result to the demultiplex unit 205.

Next, the service manager 404 requests the CA 405d in the Java library 405 to perform descrambling. The CA 405d provides the descrambler 206 with information required for descrambling, through the condition-release 401b2 of the library 401b in the OS 401. On the basis of such provided information, the descrambler 206 descrambles the signal provided by the receiving unit 204, and passes the result to the TS decoder 207.

The service manager 404 provides the identifier of the channel to a JMF 405a in the Java library 405, and requests for the playing of the video and audio.

First, the JMF 405a obtains, from a PAT and a PMT, packet IDs used to specify the video and audio to be played. PAT and PMT are tables stipulated by the MPEG-2 standard that show the TV-program line-up included in an MPEG-2 transport stream. PAT and PMT are embedded in the payloads of packets included in an MPEG-2 transport stream, and are sent together with audio and video. Refer to the Specification for details. Here, only the outline shall be described. PAT, which is an abbreviation of Program Association Table, is stored and sent in packets with the packet ID "0". In order to obtain the PAT, the JMF 405a specifies, to the demultiplex unit 205, the packet ID "0", through the library 401b in the OS 401. The demultiplex unit 205 performs filtering based on the packet ID "0" and, by passing the result to the CPU 212, the JMF 405a collects the PAT packets.

Figure 9:
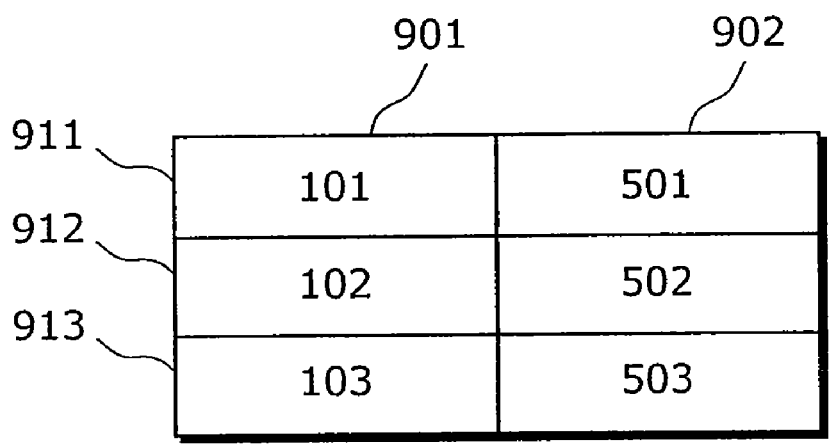
FIG. 9 is a chart showing an example of PAT stored in the secondary storage unit 203 in the embodiment of the present invention.

FIG. 9 is a chart which schematically shows an example of information of the collected PAT. A column 901 describes program numbers. A column 902 describes packet IDs. The packet IDs shown in the column 902 are used to obtain the PMT. Each of rows 911 to 913 is a pair of the program number of a channel and a corresponding packet ID. Here, three channels are defined. The row 911 defines a pair of the program number "101" and the packet ID "501". Now, when the channel identifier provided to the JMF 405a is "2", the JMF 405a refers to the column 912 in FIG. 9, so as to obtain the corresponding program number "102", and then refers to the column 912 in the PAT shown in FIG. 9, so as to obtain the packet ID "502" corresponding to the program number "102". PMT, which is an abbreviation of Program Map Table, is stored and sent in packets of the packet ID stipulated in the PAT. In order to obtain the PMT, the JMF 405a specifies the packet ID to the demultiplex unit 205, through the library 401b in the OS 401. Here, it is assumed that the packet ID specified is "502". The demultiplex unit 205 performs filtering based on the packet ID "502" and, by passing the result to the CPU 212, the JMF 405a collects the PMT packets.

Figure 10:
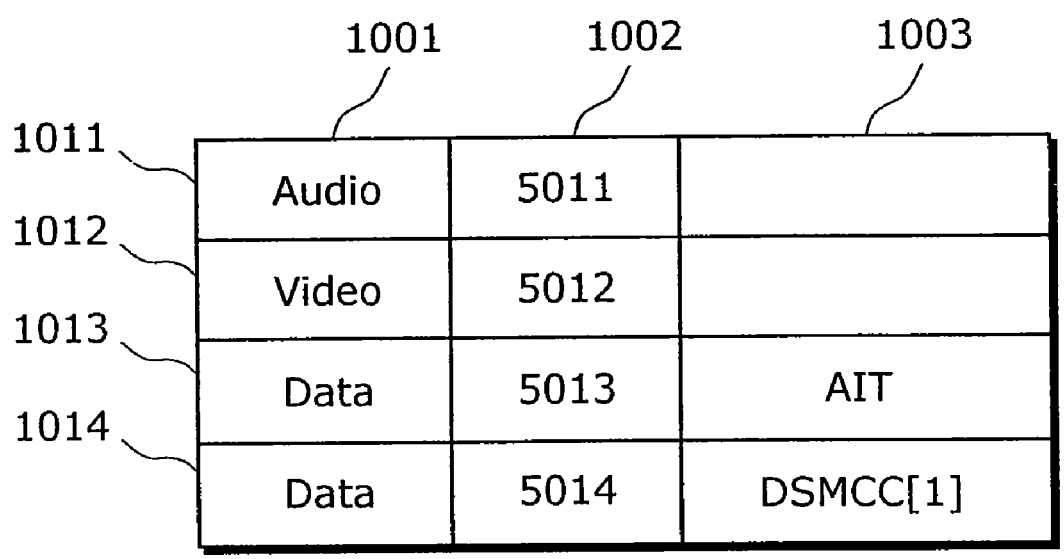
FIG. 10 is a chart showing an example of PMT stored in the secondary storage unit 203 in the embodiment of the present invention.

FIG. 10 is a chart which schematically shows an example of information of the collected PMT. A column 1001 describes stream types. A column 1002 describes packet IDs. Information specified in the respective stream types is stored and sent in the payloads of packets with the packet IDs specified in the column 1002. A column 1003 describes supplementary information. Each of columns 1011 to 1014 is a pair of a packet ID and the type of information being transmitted, which is known as an elementary stream. The column 1011, which is a pair of the stream type "audio" and the packet ID "5011", indicates that audio data is stored in the payload of the packet with the packet ID "5011". The JMF 405a obtains, from the PMT, the packet IDs of the video and audio to be played. Referring to FIG. 10, the JMF 405a obtains the audio packet ID "5011" from the row 1011, and the video packet ID "5012" from the row 1012.

Next, the JMF 405a passes the obtained audio packet ID and video packet ID to the AV playing 401b3 of the library 401b in the OS 401. Upon receiving this, the AV playing 401b3 provides the received audio packet ID and video packet ID to the TS decoder 207. The TS decoder 207 performs filtering based on such provided packet IDs. Here, the packet with the packet ID "5011" is passed to the audio output unit 209, and the packet with the packet ID "5012" is passed to the video output unit 208. The audio output unit 209 converts (for example, digital-analog conversion) the provided packet, as necessary, and outputs this. The video output unit 208 converts (for example, digital-analog conversion) the provided packet, as necessary, and outputs this.

Finally, the service manager 404 provides the channel identifier to an AM 405b in the Java library 405, and requests for data broadcast playing. Here, data broadcast playing refers to extracting a Java program included in the MPEG-2 transport stream, and having it executed by the Java VM 403. As a method of encapsulating a Java program in an MPEG-2 transport stream, a method referred to as DSMCC, which is described in the MPEG Standard ISO/IEC 13818-6, is used. Here, detailed description of DSMCC shall be omitted. The DSMCC format defines a method of encoding the file system made up of directories and files used by a computer in the packets of an MPEG-2 transport stream. Furthermore, information about the Java program to be executed is embedded and sent in packets in the MPEG-2 transport stream in a format referred to as AIT. AIT is an abbreviation of Application Information Table defined in the 10th chapter of the DVB-MHP Standard (formally as, ETS TS 101 812 DVB-MHP Specification V1.0.2).

First, in order to obtain the AIT, the AM 405b obtains the PAT and PMT as in the case of the JMF 405a, so as to obtain the packet ID of the packet that stores the AIT. Now, when "2" is the identifier of the provided channel and the PAT shown in FIG. 9 and the PMT shown in FIG. 10 are being transmitted, the AM 405b obtains the PMT shown in FIG. 10 according to the same procedure followed by the JMF 405a. The AM 405b extracts, from the PMT, the packet ID of the elementary stream having a stream type of "Data" and which has "AIT" as supplementary information. Referring to FIG. 10, the elementary stream in the row 1013 corresponds to such description, and therefore the AM 405b obtains the packet ID "5013".

The AM 405b provides the packet ID of the AIT to the demultiplex unit 205, through the library 401b in the OS 401. The demultiplex unit 205 performs filtering based on such provided packet ID, and passes the result to the CPU 212. As a result, the AM 405b can collect the packets of AIT.

Figures 11, 12:
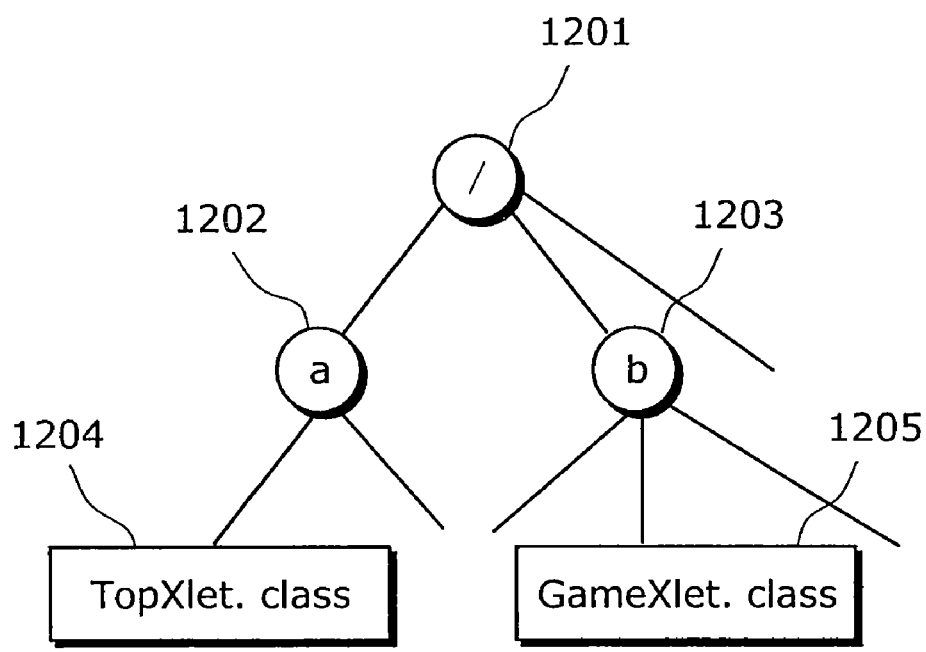
FIG. 11 is a chart showing an example of AIT stored in the secondary storage unit 203 in the embodiment of the present invention.
FIG. 12 is a diagram showing an example of a file system stored in the secondary storage unit 203 in the embodiment of the present invention.

FIG. 11 is a chart which schematically shows an example of information of the collected AIT. A column 1101 describes the identifiers of Java programs. A column 1102 describes control information of the Java programs. The control information includes "autostart", "present", and "kill". "autostart" means that the data transmitting apparatus 101 automatically executes the program immediately. "present" means that the program is not executed automatically. "kill" means that the program is to be terminated. A column 1103 describes DSMCC identifiers for extracting packet IDs including a Java program in the DSMCC format. A column 1104 describes program names of the Java programs. Each of rows 1111 and 1112 is a set of information about a Java program. The Java program defined in the row 1111 is a set of an identifier "301", control information "autostart", a DSMCC identifier "1", and a program name "a/TopXlet". The Java program defined in the row 1112 is a set of an identifier "302", control information "present", a DSMCC identifier "1", and a program name "b/GameXlet". Here, the two Java programs have the same DSMCC identifier which indicates that two Java programs are included within a single file system encoded in the DSMCC format. Here, only four items of information are stipulated for the respective Java programs, but more items of information are specified in actuality. Refer to the DVB-MHP standard for details.

The AM 405b finds the "autostart" Java program from within the AIT, and extracts the corresponding DSMCC identifier and Java program name. Referring to FIG. 11, the AM 405b extracts the Java program in the row 1111, and obtains the DSMCC identifier "1" and the Java program name "a/TopXlet".

Next, using the DSMCC identifier obtained from the AIT, the AM 405b obtains, from the PMT, the packet ID of packets that store Java programs in the DSMCC format. More specifically, the AM 405b obtains, from within the PMT, the packet ID of the elementary stream whose stream type is "Data" and having a matching DSMCC identifier in the supplementary information.

Now, assuming that such DSMCC identifier is "1" and the PMT is that shown in FIG. 10, the elementary stream in the row 1014 matches, and thus the AM 405b extracts the packet ID "5014".

The AM 405b specifies the packet ID of the packet in which data is embedded in the DSMC format, to the demultiplex unit 205, through the library 401b in the OS 401. Here, the packet ID "5014" is provided. The demultiplex unit 205 performs filtering based on such provided packet ID, and passes the result to the CPU 212. As a result, the AM 405b can collect the required packets. The AM 405b reconstructs the file system from the collected packets, according to the DSMCC format, and stores this in the first memory 202 or the second memory 203. Extracting the data of a file system, and the like, and storing this in the first memory 202 or the second memory 203 shall hereafter be referred to as download.

FIG. 12 is a diagram showing an example of a downloaded file system. In the figure, a circle denotes a directory and a square denotes a file. 1201 denotes a root directory, 1202 denotes a directory "a", 1203 denotes a directory "b", 1204 denotes a file "TopXlet.class", and 1205 denotes a file "GameXlet.class".

Here, although an example of downloading a file system from an MPEG-2 transport stream is described, the OCAP specification also stipulates downloading using an IP network, and so on. Furthermore, a method for identifying the location of a file system using information referred to as XAIT, instead of AIT, and downloading the file system is also stipulated.

Next, the AM 405 passes, to the Java VM 403, the Java program to be executed from within the file system downloaded into the first memory 202 or the second memory 203. Here, when the name of the Java program to be executed is "a/TopXlet", the file "a/TopXlet.class", having ".class" added to the end of the Java program name, is the file to be executed. "/" is a division of a directory and file name and, by referring to FIG. 12, the file 1204 is the Java program to be executed. Next, the AM 405b passes the file 1204 to the Java VM 403.

The Java VM 403 executes the Java program passed to it.

Upon receiving an identifier of an other channel, the service manager 404 terminates, through the respective libraries included in the Java library 405, the execution of the video/audio and Java program currently played likewise through the respective libraries included in the Java library 405, and performs the playing of video/audio and execution of a Java program based on the newly received channel identifier.

Furthermore, the service manager 404 also includes a function for receiving the channel identifier from a Java program executed on the Java VM 403, aside from the reproduction unit 402b. Specifically, a Java language class for obtaining the identifier of the channel, and the method thereof, are provided. Upon receiving an identifier of a channel, the service manager 404 terminates, though the respective libraries included in the Java library 405, the execution of the video/audio and Java program currently played likewise through the respective libraries included in the Java library 405, and subsequently performs the playing of new video/audio and the execution of a Java program based on the newly received channel identifier.

Next, the process of receiving a digital broadcast and storing the multimedia data thereof into the second memory 203, in the data transmitting apparatus 101 shall be described.

Figure 13:
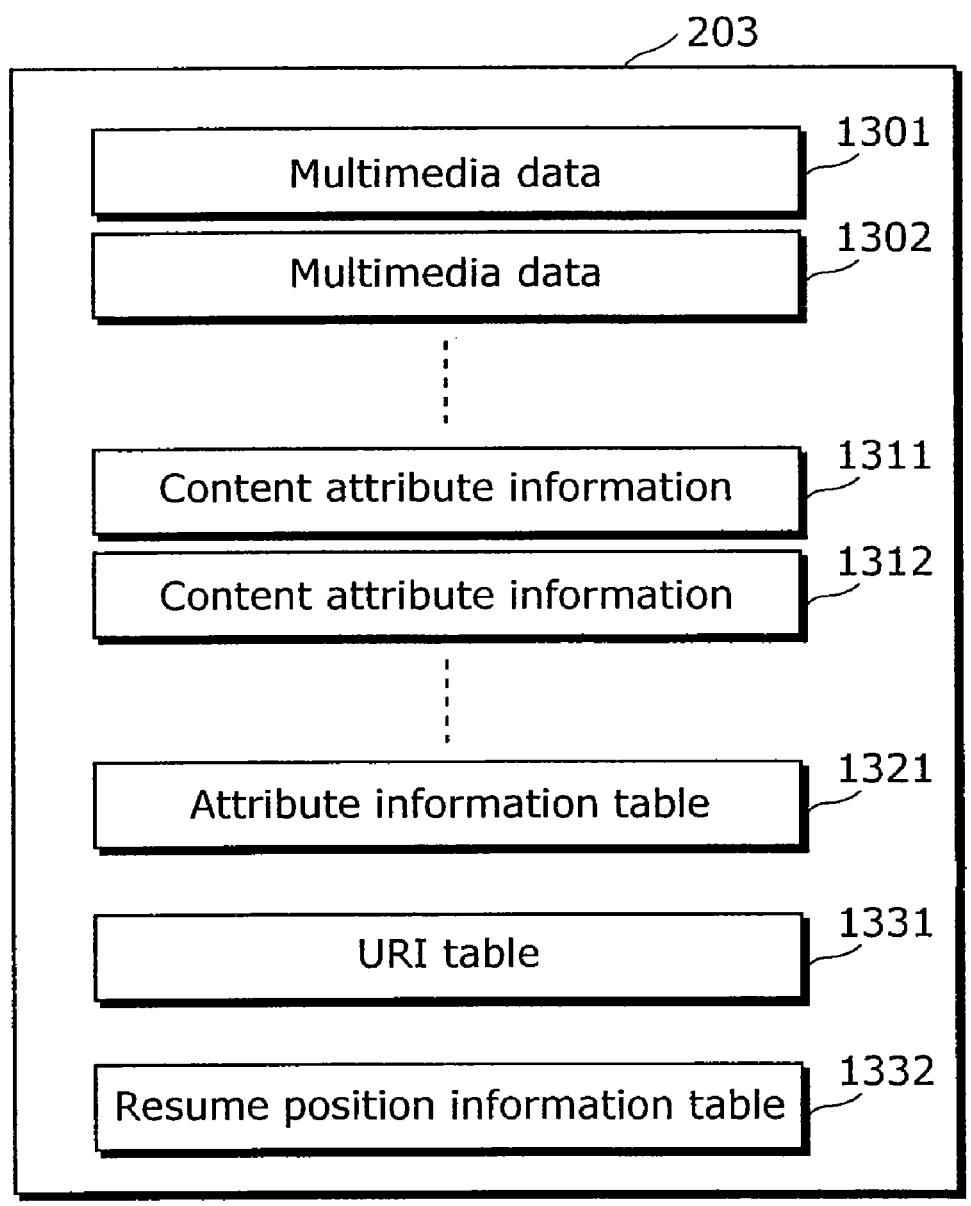
FIG. 13 is a diagram showing an example of the structure of data stored in the secondary storage unit 203 in the embodiment of the present invention.

FIG. 13 is a diagram showing an example of the configuration for storing multimedia data into the second memory 203 by the data transmitting apparatus 101. The data transmitting apparatus 101 stores, in the second memory 203, multimedia data and its attribute information (content attribute information), an attribute information table, a URI table, and a resume position information table. In FIG. 13, 1301, 1302, . . . denote multimedia data, 1311, 1312, . . . denote attribute information (content attribute information) of the multimedia data, 1321 denotes an attribute information table, 1331 denotes a URI table, and 1332 denotes a resume position information table. The multimedia data 1301, 1302, . . . are multimedia data encoded in the MPEG transport stream format. The content attribute information 1311, 1312, . . . are additional information such as the title of each multimedia data. Here, the content attribute information 1311 describes attribute information of the multimedia data 1301, and the content attribute information 1312 describes attribute information of the multimedia data 1302.

FIG. 14 is a diagram showing an example of content attribute information in the present embodiment. In the present embodiment, content attribute information is expressed by text defined in the Extensible Markup Language (XML). In FIG. 14, ContentID, which is an element of content attribute information, describes the identifier of a content; ParentID, which is an element of content attribute information, describes an ID of a container in which the content is included; FileName, which is an element of content attribute information, describes the filename of the multimedia data; ChannelID, which is an element of content attribute information, describes an identifier of a channel on which the TV-program was broadcast, as shown in column 601 in FIG. 6; ProgramNo, which is an element of content attribute information, describes a program number for searching the PMT, as shown in column 704 in FIG. 7; Title, which is an element of content attribute information, describes the TV-program name as shown in column 602 in FIG. 6; Genre, which is an element of content attribute information, describes the type of the program, as shown in column 606 in FIG. 6; Date, which is an element of content attribute information, describes the date and time at which the TV-program was broadcast; RecordDate, which is an element of content attribute information, describes the date and time at which the TV-program was recorded; ocap:PresentationPoint (resume point information), which is an element of content attribute information, describes the resume position for implementing RESUME for the multimedia data and the resume position identifier of the resume position.

Furthermore, the content attribute information is not limited to the XML configuration, and may be recorded in other formats such as binary data.

The attribute information table 1321 is a correspondence chart for the identifier of the content and the file on which the content attribute information indicated by the identifier is recorded.

FIG. 15 is a chart showing an example of the attribute information table 1321. In FIG. 15, a column 1501 describes the content identifiers, and a column 1502 describes file names of the content attribute information. Rows 1511 to 1513 are pairs of the content identifier and the file name of the corresponding content attribute information. From column 1511, it can be read that the content attribute information of the content identifier "ContentID00" is recorded in the file "0001.attr".

The URI table 1331 shows the correspondence between the content identifier and Uniform Resource Identifier (URI) for accessing the content indicated by the identifier.

Figure 16:
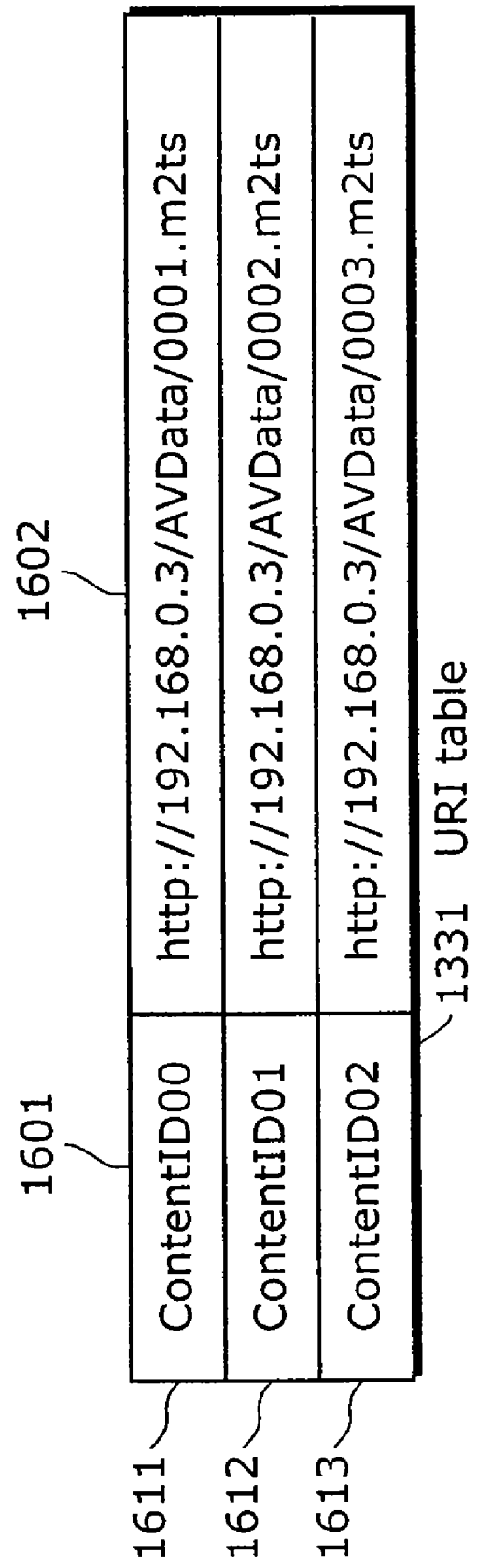
FIG. 16 is a chart showing an example of a URI table in the embodiment of the present invention.

FIG. 16 is a chart showing an example of the structure of the URI table 1331. In FIG. 16, a column 1601 describes the identifiers of respective contents, and a column 1602 describes URIs for accessing the respective contents. Each of rows 1611 to 1613 shows a pair of a content identifier and a URI. For example, row 1611 indicates that the URI of the content for identifier "ContentID00" is "http://192.168.0.3/AVData/0001.m2ts". The resume position information table 1332 shall be described later.

Hereinafter, the storing process shall be described. First, the operation up to descrambling is the same as in the case of the previously described playing. Next, the service manager 404 requests the storing of the multimedia data to the Rec 405j inside the Java library 405. The Rec 405j first obtains the PAT and PMT in the same manner as the JMF 405a and AM 405b, and obtains packet IDs for the video data, audio data, and respective section data relating to the TV-program to be stored. Now, when "2" is the identifier of the provided channel and the PAT shown in FIG. 9 and the PMT shown in FIG. 10 are being transmitted, the Rec 405j obtains the PMT shown in FIG. 10 according to the same procedure followed by the JMF 405a. The data to be stored are all the data described in the PMT in FIG. 10.

The Rec 405j provides these packet IDs to the decoder 207 via the library 401b in the OS 401 and causes these to be outputted to the TS multiplexer 210. The TS decoder 207 performs filtering based on such provided packet IDs, and passes data to the TS multiplexer 210. It is to be noted that it is also acceptable to have respective version numbers affixed to the section data, and the TS decoder 27 outputs the same type of data only once for each version number and the rest are filtered.

The Rec 405j provides, to the TS multiplexer 210 through the library 401b in the OS 401, the number of types of data to be transmitted, and causes the configuration of an MPEG-2 transport stream from the data passed on from the TS decoder 207. The TS multiplexer 210 passes the configured MPEG transport stream to the CPU 212.

In addition, the Rec 405j writes, into the second memory 203, the MPEG transport stream received by the CPU 212 from the TS multiplexer 210, by requesting the IO 405g inside the Java library 405. In addition, the Rec 405j receives the channel identifier of the TV-program by requesting the service manager 404, and reads the TV-program information corresponding to the stored multimedia data from among the TV-program information stored in the second memory 203 shown in FIG. 6, by requesting the IO 405g. In addition, the Rec 405j issues the identifier of the stored multimedia data, creates content attribute information from the obtained TV-program information and the file name under which the multimedia is stored, and writes the attribute information into the second memory 203 by requesting the IO 405g. In addition, the Rec 405j updates the attribute information table 1321 by reading the attribute information table 1321 and updating its details by requesting the IO 405g, and writing the updated attribute information table into the second memory 203 by requesting the IO 405g.

Next, the process in the case where multimedia data of a received digital broadcast is outputted from the network unit 211 shall be described.

First, the network library 405e located inside the Java library 405 receives a request from a data receiving apparatus connected to the network 104, and provides the identifier of the channel being requested, to the service manager 404. The service manager 404 provides the received channel identifier to the Tuner 405c and requests tuning, then in addition requests descrambling to the CA 405d. Next, the service manager 404 returns the process to the network library 405e.

The network library 405e controls the TS decoder 207 and the TS multiplexer 210 and creates an MPEG transport stream from the video data, audio data, and section data of the TV-program, in the same manner as the Rec 405j described above.

In addition, the network library 405e provides the address of the transmission destination to the NET 401b4 of the library 401b in the OS 401. Next, the network library 405e converts the MPEG transport stream received from the TS multiplexer 210 into a format that is in accordance with the protocol of the application layer to be transmitted, and sequentially passes the converted MPEG transport stream to the NET 401b4. An application layer protocol refers to, for example, HTTP, RTP, and so on. With this, the NET 401b4 refers to the transmission destination address, and converts the data passed on to it into IP network packets and passes these to the network unit 211. The network unit 211 converts the data passed on to it into a signal that is in accordance with the physical media of the network connected to, and outputs this signal.

Next, the process when playing the multimedia data stored in the second memory 203 shall be described. Upon receiving the content identifier, the service manager 404 reads the attribute information table 1321 from the second memory 203 and searches for the file in which the content attribute information of the content identifier is recorded, by requesting the IO 405g inside the Java library 405. In the attribute information table 1321 in FIG. 15, when the content identifier is "ContentID00", the file is "0001.attr". Next, by requesting the IO 405g, the service manager 404 reads the file in which the attribute information is recorded, from the second memory 203. The service manager 404 obtains the file name under which the multimedia data of the content is recorded, from the read content attribute information. In the case of the content attribute information in FIG. 14, the file name is "0001.m2ts".

Next, by requesting the IO 405g, the service manager 404 reads the MPEG transport stream from the file of the multimedia data. The IO 405g reads the data through the library 401b in the OS 401, and passes the data to the CPU 212. The service manager 404 passes the read MPEG transport stream to the demultiplex unit 205, through the library 401b in the OS 401.

Next, the service manager 404 requests the CA 405d in the Java library so that the descrambler 206 lets the data through without descrambling. The CA 405d provides the descrambler 206 with information, through the condition-release 401b2 of the library 401b in the OS 401. With this, the descrambler 206 passes the data passed on to it by the demultiplex unit 205, as-is, to the TS decoder 207.

Next, the service manager 404 reads the channel identifier or program number from the read content attribute information, provides this to the JMF 405a inside the Java library 405, and requests for playing. Hereafter, the playing of video data and audio data is performed according to the same process as in the previously described case of a content received from a broadcast.

In addition, the service manager 404 provides the channel identifier or the program number to the AM 405b inside the Java library 405, and requests for data broadcast playing. Hereafter, the data broadcast playing can be performed according to the same process as in the previously described case of a content received from a broadcast.

The Java library 405 is a collection of plural Java libraries stored in the second memory 203. In the present embodiment, the Java library 405 includes the JMF 405a, the AM 405b, the Tuner 405c, the CA 405d, the network library 405e, a playing Lib 405f, the IO 405g, an AWT 405h, an SI 405i, the Rec 405j, and so on.

Since the functions of the JMF 405a, the AM 405b, the Tuner 405c, the CA 405d, and the Rec 405j have already been described, further description shall be omitted.

The reproduction Lib 405f provides the class and method of the Java language (hereafter called Java API) for passing, to the Java program, the identifier of the channel currently being played, which is stored in the second memory 203. By using this Java API, the Java program is able to recognize the channel that is currently played.

The IO 405g provides, to the Java program, a Java API for the writing of data to the second memory 203 by the Java program, or a Java API for the reading of such data which has been written into the second memory 203. By using this API, the Java program is able to store arbitrary data in the secondary memory 203. Since such stored data is not erased even when power to the data transmitting apparatus 101 is turned off, the data can be read again after power to the data transmitting apparatus 101 is turned on.

The AWT 405h provides Java APIs for drawing or for the reception of a key input notification from the input unit 201, by the Java program. To be more specific, these correspond to the java.awt package, java.awt.event package, and other java.awt subpackages described in "The Java Class Libraries, Second Edition, Volume 2" (ISBN 0-201-31003-1). Here, detailed description shall be omitted.

The SI 405i provides Java APIs for the obtaining of channel information and electronic TV-program list information by the Java program. To be more specific, there are the Java TV Specification and the like. Furthermore, the MPEG section filter API for obtaining raw binary data from an MPEG transport stream currently being broadcast is defined in the OCAP Specification, and the Java application can understand and handle unique electronic TV-program data that has been transmitted.

The network library 405e, through the NET 401b4 of the library 401b in the OS 401, communicates with the data receiving apparatus 102 and the data receiving apparatus 103 which are connected to the network 104. The communication includes the transmission of a content list or EPG, the receiving of multimedia data transmission, transmission pausing, transmission resumption, and transmission end requests from a data receiving apparatus, and the transmission of multimedia data.

Figure 17:
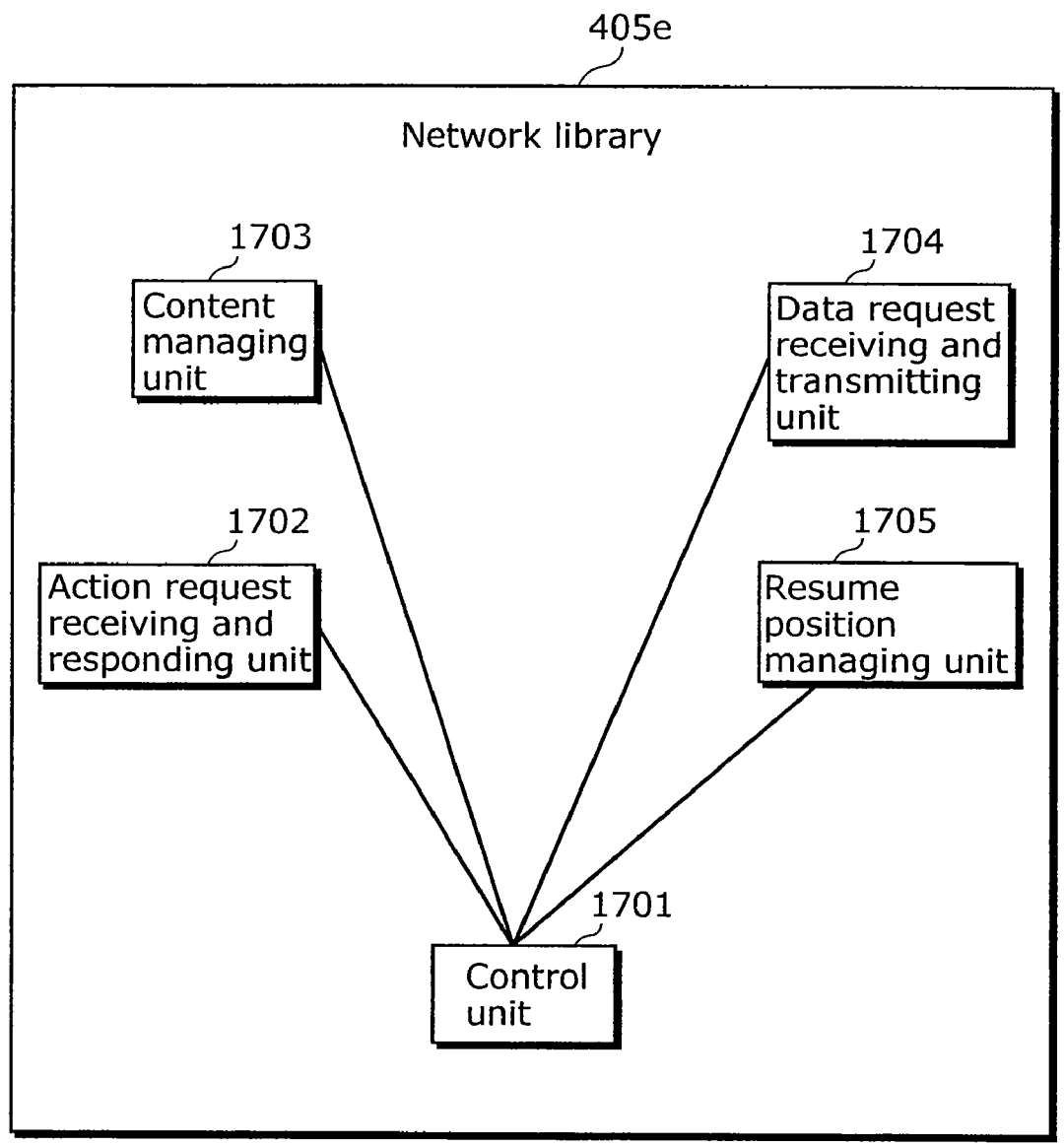
FIG. 17 is a diagram of the internal configuration of the network library 405e in the embodiment of the present invention.

FIG. 17 is a block diagram showing an example of the internal configuration of the network library 405e. The network library 405e includes a control unit 1701, an action request receiving and responding unit 1702, a content managing unit 1703, a data request receiving and transmitting unit 1704, and a resume position managing unit 1705. Note that the network library 405e may include other functions relating to the IP network.

The control unit 1701 provides the activation and termination of the server function of the data transmitting apparatus 101, and the processing of requests from a client. The control unit 1701 can activate and terminate the server function by providing Java APIs to the downloaded Java application, that is, the server application, and by the server application calling such API. The control unit 1701 performs processing by using the libraries inside the network library 405*e*, such as the content managing unit 1703 and the resume position managing unit 1705, as necessary.

Furthermore, upon receiving a request from the data receiving apparatus 102 and the data receiving apparatus 103 while the server function is being executed, the control unit 1701 performs processing which responds to the request.

The action request receiving and responding unit 1702 controls the network unit 211 through the NET 401*b*4 inside the library 401*b* in the OS 401, and receives a request of CDS:Browse or CDS:UpdateObject provided by UPnP AV CDS service, from a specified data receiving apparatus connected to the network 104. Upon receiving a CDS:Browse, the action request receiving and responding unit 1702 notifies the received information to the content managing unit 1703. Furthermore, upon receiving a CDS:UpdateObject for performing the updating of the resume position, the action request receiving and responding unit 1702 notifies this to the resume position managing unit 1705, and updates the resume position information table 1332 (or the content attribute information). Subsequently, the action request receiving and responding unit 1702 performs the processing responding to the received request by using the content managing unit 1703 and the resume position managing unit 1705, and creates and transmits a response message.

The content managing unit 1703 performs the management of the contents stored in the second memory 203, the generation and management of a content directory 2101 such as that shown in FIG. 21 in response to a request from the server application, and the management of the content attribute information added to the respective objects.

Since there is one root container 2102 in a server according to the UPnP AV CDS Specification, the content managing unit 1703 generates the root container 2102 when activation of the server function is performed by the control unit 1701. In addition, the content managing unit 1703 provides Java APIs to the server application. It is to be noted that description regarding the Java API for adding a content shall be omitted. Furthermore, since the Java API for obtaining content and content attribute information can be obtained by using, in the same manner, a Java API of the data receiving apparatus to be described later, description shall be omitted here. Subsequently, using a provided Java API, the server application requests the content managing unit 1703 for the adding of objects under the root container 2102, and the content managing unit 1703 generates the content directory 2101 in accordance with the request. Here, when the content managing unit 1703 adds an object, it sets the initial value "−1" to the ocap:PresentationPoint indicating the resume position among the content attribute information held by the added object.

It is to be noted that although a method in which the generation of the content directory 2101 is performed according to the instruction of the server application is described here, the content managing unit 1703 may generate the content directory 2101 without the involvement of the server application.

Furthermore, upon receiving a CDS:Browse action from the action request receiving and responding unit 1702, the content managing unit 1703 obtains the content identifier of the object specified by the CDS:Browse action and the BrowseFlag of the CDS:Browse. The BrowseFlag indicates either an "obtainment request for information regarding a specified object" or an "obtainment request for information of a child object of a specified container". Subsequently, the content managing unit 1703 reads the information of the object having the obtained content identifier by requesting the IO 405*g*.

When the Browse action is a request for information of the specified object, the network library 405*e* extracts information defined in UPnP AV CDS and DLNA from the read information of the object, converts the information into a format defined in UPnP AV CDS and DLNA, transmits the converted information to the request-source client, and ends the process.

Meanwhile, when the Browse action is a request for information of a child object of the specified container, the content managing unit 1703 refers to the respective content attribute information in the attribute information table 1321 and compares the Parent ID of the content attribute information and the content identifier of the container specified by the CDS:Browse so as to obtain a collection of matching objects. At this time, for each object included in the collection of matching objects, the content managing unit 1703 converts content attribute information into the UPnP AV CDS-defined format, and notifies this to the action request receiving and responding unit 1702 as a response result of the CDS:Browse action.

FIG. 24 and FIG. 25 are diagrams showing an example of a part taken from a response to a CDS:Browse action. The data request receiving and transmitting unit 1704 controls the network unit 211 through the NET 401*b*4 inside the library 401*b* in the OS 401, and receives a transmission request for multimedia data stored in the second memory 203 from the specified data receiving apparatus connected to the network 104. Then, in accordance with the received request, the data request receiving and transmitting unit 1704 transmits the multimedia data to the request-source data receiving apparatus.

The data request receiving and transmitting unit 1704 analyzes the request message transmitted from the request-source data receiving apparatus, and obtains the URI of the requested content.

Next, the data request receiving and transmitting unit 1704 reads the URI table 1331 by requesting the IO 405*g*. The identifier of the requested content is obtained from the read URI table 1331 and the URI obtained from the request message. For example, in the URI table shown in FIG. 16, when the requested URI is "http://192.168.0.3/AVData/0001.m2ts", a content identifier "ContentID00" is obtained from the details in row 1611.

Next, the data request receiving and transmitting unit 1704 reads the content attribute information (file) of the obtained file name by requesting the IO 405*g*. The data request receiving and transmitting unit 1704 obtains the file name under which the multimedia data of the content is recorded, from the FileName among the details of the read content attribute information. For example, in the case of the content attribute information shown in FIG. 14, it can be seen that the file name of the multimedia data is "0001.m2ts".

Next, the data request receiving and transmitting unit 1704 verifies the presence of the multimedia data of the obtained file name by requesting the IO 405*g*. When not present, the data request receiving and transmitting unit 1704 generates an error message, transmits this to the request-source data receiving apparatus, and ends the process. When present, the data request receiving and transmitting unit 1704 collects information, such as information of the content attribute information and the file size which is obtainable by requesting the IO 405*g*, generates the header of a reply message, and transmits the header to the request-source data receiving apparatus. Next, by requesting the IO 405*g*, the data request receiving and transmitting unit 1704 sequentially reads the multimedia data and transmits the read data to the request-source data receiving apparatus. At this time, when the range of data to be obtained is set in the request of the request-source data receiving apparatus, using a TimeSeek.Range.dlna.org header, and so on, the data request receiving and transmitting unit 1704 transmits the multimedia data from the specified position.

The resume position managing unit 1705 performs processes (content attribute information updating) such as the adding, changing, and deleting of the ocap:PresentationPoint (resume position information) of content attribute information. The resume position managing unit 1705 receives, from the action request receiving and responding unit 1702, the content identifier, the ocap:PresentationPoint before updating and the updated ocap:PresentationPoint. It is to be noted that, when the resume position identifier is not set in the information received from the action request receiving and responding unit 1702, the resume position managing unit 1705 sets the resume position identifier. As an example of the resume position identifier, there is information of the data receiving apparatus that transmitted the CDS:UpdateObject request (information unique to the data receiving apparatus such as Friendly Name, UUID, IP address, MAC address, information unique to the client application that runs on the data receiving apparatus such as organization_id and application_id, or the like), or the date and time at which the CDS:UpdateObject is received.

The resume position managing unit 1705 first obtains the resume position information table 1332, and obtains the resume position information associated with the content identifier received from the action request receiving and responding unit 1702. In addition, when the resume position identifier is set in the content attribute information before updating, the resume position managing unit 1705 updates the resume position which has a matching resume position identifier, based on the associated resume position information.

In this manner, by updating content attribute information, the resume position managing unit 1705 is able to update the resume position information table 1332 managed by the resume position managing unit 1705.

Here, an example is shown in which a new resume position is added to the updated content attribute information for a content for which the resume position before updating is the initial value.

Addition of Resume Position

FIG. 18 is a chart showing the resume position information table 1332 in the initial state. A column 1801 in FIG. 18 includes content identifiers, 1802 includes resume positions, and 1803 includes resume position identifiers, each of rows 1811 to 1813 indicated the attributes of the resume position information of multimedia data recorded in the second memory 203. Here, since the resume position information table 1332 is in the initial state in FIG. 18, "−1" is set in all of the resume positions in 1802, and the resume position identifiers in 1803 are not-set.

Here, an example is shown for the case where the resume position information before updating, which is set to the initial value "−1" since the resume information associated with the content identifier "ContentID00" is not-set, is updated, as updated resume position information, to resume position information in which the resume position is "00:30:00" and the resume position identifier is "LivingRoom", by the resume position managing unit 1705.

The resume position managing unit 1705 obtains the resume position information table in FIG. 18, and searches for the content identifier "ContentID00" specified by the action request receiving and responding unit 1702. At this time, the resume position managing unit 1705 obtains the row 1811 in which the content identifier in column 1801 is the same, and sets the updated resume position information to the column 1802 and the column 1803. Here, "00:30:00" is set to the column 1802, and "LivingRoom" is set to the column 1803 (row 1911 in FIG. 19").

Furthermore, in the same manner, deletion and changing can be implemented by setting the resume position and resume position identifier to the content attribute information before updating, and by setting, to the updated content attribute information, the resume position and resume position identifier to which changing is desired.

It is to be noted that in such a method, all applications that have been downloaded (hereafter called downloaded application) that are present in the network can update the resume position information table 1332. However, the downloaded applications that run on all the data receiving apparatuses are not necessarily always the same download applications. As such, it is possible to assume a demand for restricting another application's updating of a resume position and resume position identifier set by a high-priority application.

Consequently, by adding application information to the resume position identifier when the data receiving apparatus 102 and the data receiving apparatus 103 transmit a CDS:UpdateObject, it is possible to perform restriction in which the resume position managing unit 1705 does not update the resume position information table 1332 for a request from an application having application information that does not match.

FIG. 20 is a chart showing an example of the resume position information table 1332 holding application identifiers. Application information is held in columns 2004 to 2006. Here, although Organization_id is set in the column 2004, Application_id is set in column 2005, and Group_identifier is set in the column 2006, the application information to be used may be a part of these. Furthermore, other means of expression such as Application_name are also acceptable.

When receiving a resume position information update request from the action request receiving and responding unit 1702, the resume position managing unit 1705 also receives information of the application that runs on the data receiving apparatus requesting for the update, and returns an error to the action request receiving and responding unit 1702 without updating the resume position and the resume position identifier when such application information is different from the application information of the data receiving apparatus that has set the resume position of the content recorded in the resume position information table 1332, thereby enabling the restriction of applications performing the updating of the resume to position.

It is to be noted that although FIG. 18, FIG. 19, and FIG. 20 are given as examples of the resume position information table 1332 stored in the second memory 203, other formats are also acceptable as long as they are methods which allow the resume position managing unit 1705 to manage the resume position and the resume position identifier.

Next, the data receiving apparatus 102 and the data receiving apparatus 103 shall be described.

Figure 26:
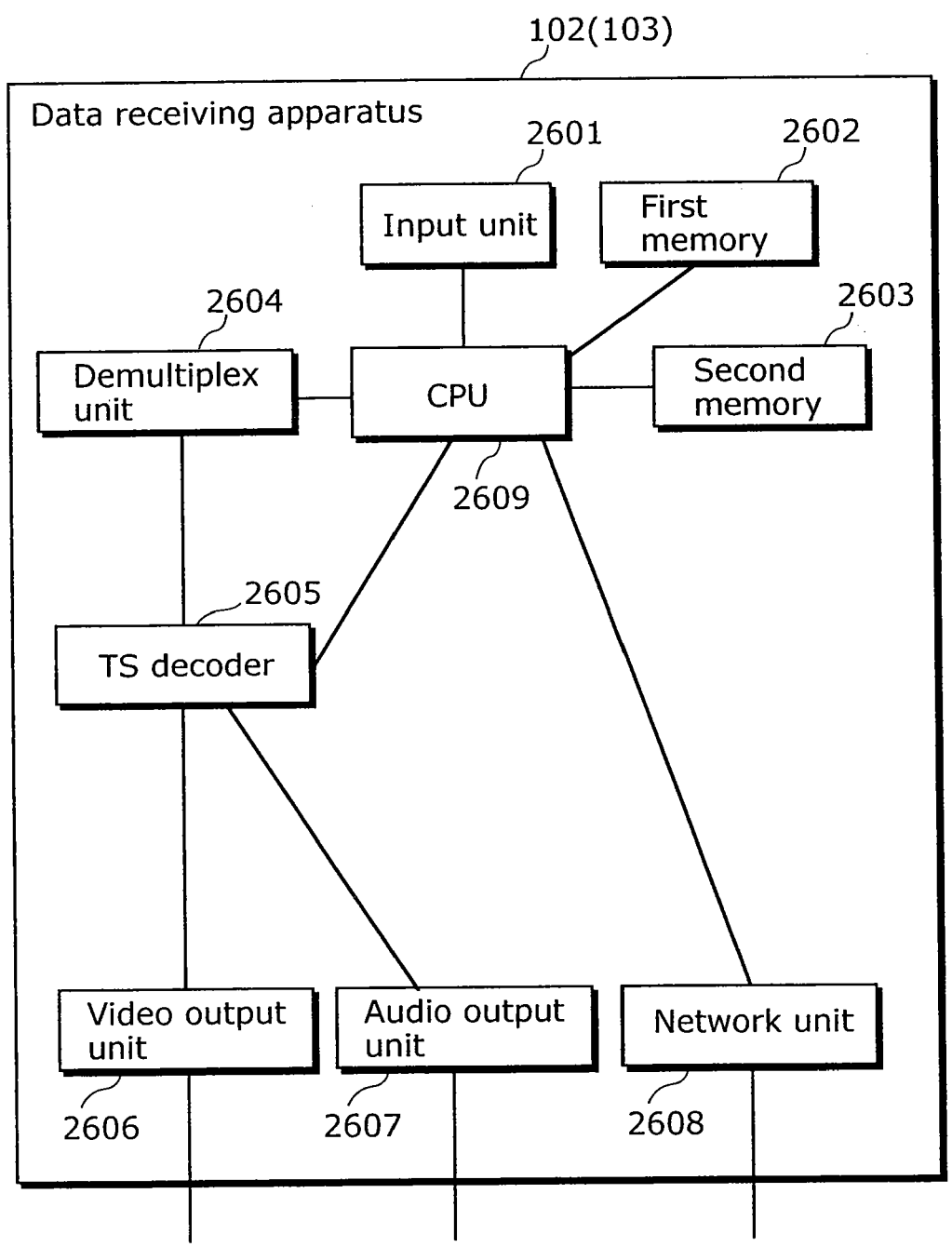
FIG. 26 is a configuration diagram for the data receiving apparatus 102 and the data receiving apparatus 103 in the embodiment of the present invention.

FIG. 26 is a block diagram showing the relationships among the constituent elements of the data receiving apparatus 102 as well as the data receiving apparatus 103 in the present embodiment. Each of the data receiving apparatuses 102 and 103 includes an input unit 2601, a first memory 2602, a second memory 2603, a demultiplex unit 2604, a TS decoder 2605, a video output unit 2606, an audio output unit 2607, a network unit 2608, and a CPU 2609.

The input unit 2601, the first memory 2602, and the second memory 2603 are identical to the input unit 201, the first memory 202, and the second memory 203 of the previously described data transmitting apparatus 101 in the present embodiment. It is to be noted that the data receiving apparatus 102 and the data receiving apparatus 103 store, in the second memory 2603, TV-program information such as the identifier, title, broadcast date and time, broadcast channel, and so on, of the multimedia data in the content list, EPG data, and so on, received from the data transmitting apparatus 101

The demultiplex unit 2604 receives an MPEG transport stream from the CPU 2609, extracts information specified by the CPU 2609, and passes the extracted information to the CPU 2609. In addition, demultiplex unit 2604 passes the MPEG transport stream directly to the TS decoder 2605.

The TS decoder 2605 receives the identifiers of audio data and video data from the CPU 2609. In addition, the TS decoder 2605 extracts data corresponding to the received identifiers of audio data and video data, from the stream received from the demultiplex unit 2604. The TS decoder 2605 passes extracted video data to the video output unit 2606, and audio data to the audio output unit 2607.

The video output unit 2606 and the audio output unit 2607 are identical to the video output unit 208 and the audio output unit 209, respectively, of the previously described data transmitting apparatus 101 in the present embodiment.

The network unit 2608, which includes a network interface, converts the data received from the CPU 2609 into a signal that is in accordance with the physical media of the network to which the network interface is connected to, and outputs this signal. Furthermore, the network unit 2608 receives a signal from the network interface, converts the signal into a packet defined by the IP network, and passes the packet to the CPU 2609.

The CPU 2609 controls the demultiplex unit 2604, the TS decoder 2605, and the network unit 2608, by executing a program stored in the second memory 2603

Figure 27:
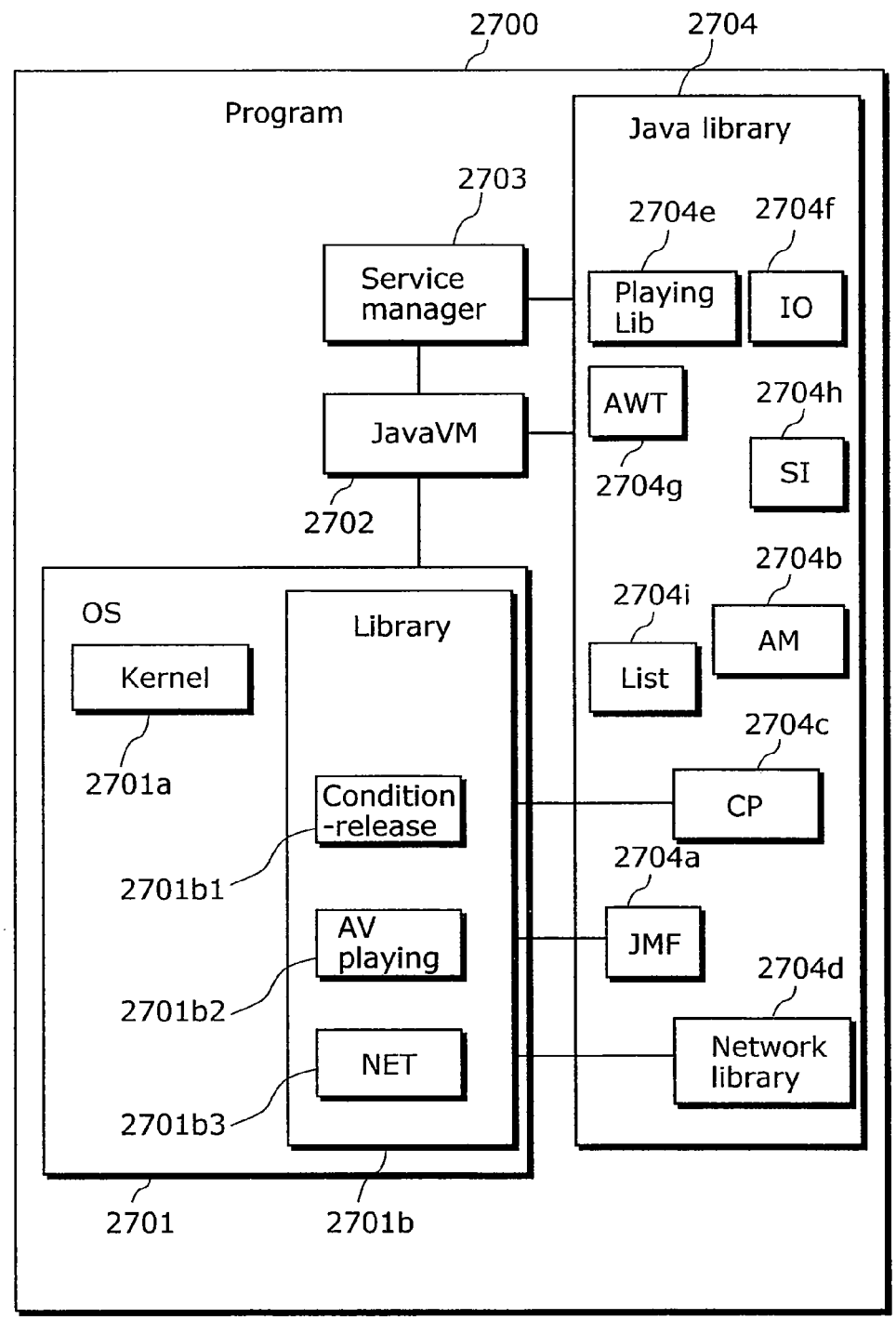
FIG. 27 is a structure diagram for a program stored by the data receiving apparatus 102 and the data receiving apparatus 103 in the embodiment of the present invention.

FIG. 27 is a structure diagram showing an example of the program stored in the second memory 2603 and executed by the CPU 2609.

A program 2700 is made up of a plurality of subprograms and specifically includes an OS 2701, a Java VM 2702, a service manager 2703, and a Java library 2704.

The OS 2701 is a subprogram activated by the CPU 2609 when power to the data receiving apparatus 102 and the data receiving apparatus 103 is turned on. OS is the acronym for operating system, an example of which is Linux and the like. The OS 2701 is a generic name for publicly known technology made up of a kernel 2701a for executing another subprogram concurrently, and of a library 2701b, and therefore detailed description shall be omitted. In the present embodiment, the kernel 2701a in the OS 2701 executes the Java VM 2702 as a subprogram. Furthermore, the library 2701b provides these subprograms with plural functions for controlling the constituent elements held by the data receiving apparatus 102 and the data receiving apparatus 103.

In the present embodiment, the library 2701b includes condition-release 2701b1, AV playing 2701b2, and NET 2701b3, as an example of functions.

The condition-release 2701b1 receives information from other subprograms and a CP 2704c of the Java library 2704, decrypts encrypted data received from the network, enables the AV playing 2701b2, and permits the playing of the multimedia data received from the network.

The AV playing 2701b2 receives an audio packet ID and video packet ID from the other subprograms and a JMF 2704a of the Java library 2704. It then provides the received audio packet ID and video packet ID to the TS decoder 2605. As a result, the TS decoder 2605 performs filtering based on the provided packet IDs, and implements the playing of video and audio.

The NET 2701b3 creates packets of a protocol lower than the application layer defined in the IP network, for the data received from the other subprograms and a network library 2704d of the Java library 2704. A protocol lower than the application layer refers to, for example, a TCP packet, a UDP packet, an IP packet, and so on. By passing this to the network unit 2608, messages and data are transmitted to another device via the network 104. Furthermore, when a message is received from another device via the network 104, the NET 2701b3 converts the message to an application layer protocol packet and passes this to the other subprograms and the network library 2704d of the Java library 2704. An application layer protocol refers to, for example, HTTP, RTSP or RTP, and so on.

The Java VM 2702 is identical to the Java VM 403 of the previously described data transmitting apparatus 101 in the present embodiment.

The service manager 2703 is identical to the service manager 404 of the previously described data transmitting apparatus 101 in the present embodiment except for the following points of difference. The service manager 404 receives a channel identifier from the playing unit 402b of the EPG 402; passes the identifier to the Tuner 405c and causes the Tuner 405c to perform tuning; performs descrambling by requesting the CA 405d; and requests the playing of video and audio by providing the channel identifier to the JMF 405a. On the other hand, the service manager 2703 receives the content identifier from a List 2704i inside the Java library 2704; passes the content identifier as well as information of the apparatus storing such content identifier, and so on, to the network library 2704d and receives a stream from the apparatus; then requests for the playing of video and audio by providing the content identifier to the JMF 2704a inside the Java library 2704. The List 2704i shall be described later.

The service manager 2703 provides, to the network library 2704d inside the Java library 2704, information such as the content identifier and the IP address of the data transmitting apparatus 101, and information such as the URI for accessing the content; requests the data transmitting apparatus 101 for the issuance of a multimedia data transmission request and the reception of the multimedia data; and in addition requests the network library 2704d to receive the multimedia data transmitted from the data transmitting apparatus 101. Upon receiving the request, the network library 2704d connects to the data transmitting apparatus 101, and issues the transmission request for the multimedia data. Subsequently, the network library 2704d passes the data transmitted by the data transmitting apparatus 101 to the CPU 2609. With this, the service manager 2703 is able to pass the received multimedia data to the demultiplex unit 2604 and carry out the playing of the multimedia data.

The Java library 2704 is a collection of plural Java libraries stored in the second memory 2603. In the present embodiment, the Java library 2704 includes the JMF 2704a, an AM 2704b, the CP 2704c, the network library 2704d, a playing Lib 2704e, the List 2704i, and so on.

The JMF 2704a, the AM 2704b, the playing Lib 2704e, an IO 2704f, an AWT 2704g, and an SI 2704h are identical to the JMF 405a, the AM 405b, the playing Lib 405f, the IO 405g, the AWT 405h, and the SI 405i, respectively, which are located inside the Java library 405 of the previously described data transmitting apparatus 101 in the present embodiment.

The CP 2704c manages rights processing of multimedia, such as the copy control and billing for the multimedia transmitted via the network 104. In the copy control, copy control information included in the section information of the transmitted transport stream is referred to, and rewriting is performed when necessary. Furthermore, billing and so on is performed by communicating with the data transmitting apparatus 101, through the network library 2704d.

The List 2704i displays an EPG of the data transmitting apparatus 101 or a list of multimedia contents stored by the data transmitting apparatus 101, selects one multimedia content from the list according to a user's operation accepted by the input unit 2601, and requests playing to the service manager 2703. At this time, information of the data transmitting apparatus 101 is also passed to the service manager 2703. Furthermore, the EPG of the data transmitting apparatus 101 and the list of contents stored by the data transmitting apparatus can be obtained through the network library 2704d. Since such information can be implemented using the method defined in UPnP DA, detailed description shall be omitted.

The network library 2704d communicates with the data transmitting apparatus 101 connected to the network 104, through the NET 2701b3 in the OS 2701. The communication with the data transmitting apparatus 101 includes multimedia data list transmission/reception, multimedia data transmission request issuance, and reception of the multimedia data.

Figures 28, 29:
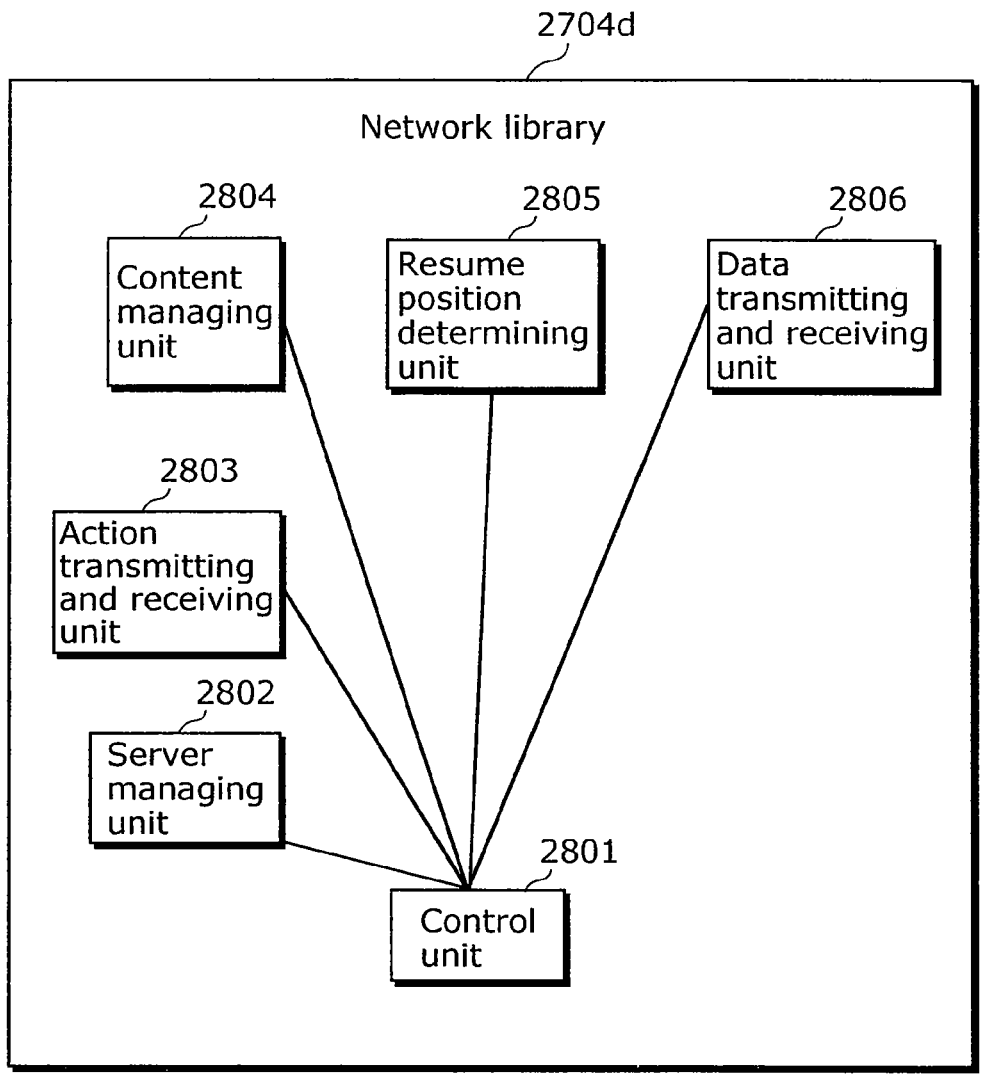
FIG. 28 is a diagram of the internal configuration of the network library 2704d in the embodiment of the present invention.
FIG. 29 is a chart showing an example of the resume position information table in the embodiment of the present invention.

FIG. 28 is a block diagram showing an example of the internal configuration of the network library 2704d. The network library 2704d includes a control unit 2801, a server managing unit 2802, an action transmitting and receiving unit 2803, a content managing unit 2804, a playing position determining unit 2805, and a data transmitting and receiving unit 2806. It is to be noted that the network library 2704d may include other functions relating to the IP network.

The control unit 2801 implements functions as a client, such as searching for a server or provided contents, playing a selected content, and so on, by providing Java APIs to the client application which is the downloaded Java application, and by the client application calling such API. The control unit 2801 performs such processes by using the server managing unit 2802, the action transmitting and receiving unit 2803, the content managing unit 2804, the playing position determining unit 2805, the data transmitting and receiving unit 2806, or the Java library 2704 and the library 2701b in the OS 2701.

The server managing unit 2802 manages information of a server present in the network 104 like the data receiving apparatus 101, that is found using a UPnP DA function, and accesses the server using a function like UPnP AV CDS. Since the present invention is not concerned with the finding of a server or a service provided by a server and information obtainment thereof, detailed description thereof shall be omitted. The server managing unit 2802 provides Java APIs to the client application. The Java APIs shall be described later.

The action transmitting and receiving unit 2803 controls the network unit 2608 through the NET 2701b3 of the library 2701b in the OS 2701, and performs the processes for connecting with a specified external apparatus connected to the network 104, and transmitting the previously described CDS: Browse or CDS:UpdateObject of UPnP AV CDS to the data transmitting apparatus 101 and receiving the response therefor.

The content managing unit 2804 manages information of the contents provided by the server obtained using a function of UPnP AV CDS such as that described previously. As such, the content managing unit 2804 manages pairs of a resume position and a resume position identifier for each content, from the information (content attribute information) of the contents provided by the obtained server. For example, when a Browse result such as that in FIG. 25 is received, the content managing unit 2804 generates a resume position information table relating to a content, and performs management on a content basis.

FIG. 29 is a chart showing an example of the resume position information table generated by the content managing unit 2804. In FIG. 29, a column 2901 describes resume positions and a column 2902 describes resume position identifiers. The content managing unit 2804 provides Java APIs to the client application. The Java APIs shall be described later.

The playing position determining unit 2805 refers to the content attribute information (or the resume position information table) held by the content managing unit 2804, and determines, from the resume position, the playing position to be used now. It is to be noted that, upon receiving a play request for a content, the playing position determining unit 2805 may obtain the resume position information table from the content managing unit 2804, present the information in the resume position information table to the user, and set the playing position through the selection by the user.

The data transmitting and receiving unit 2806 controls the network unit 2608 through the NET 2701b3 of the library 2701b in the OS 2701, and performs the connection with the specified external apparatus connected to the network 104, and the transmission and reception of a data obtainment request from the playing position determined by the playing position determining unit 2805. Subsequently, by transmitting the received data to the TS decoder 2605, playing from the playing position determined by the playing position determining unit 2805 is performed.

Next, the Java APIs provided by the server managing unit 2802 to the client application shall be described.

FIG. 30 is a diagram showing an example of the Java APIs provided by the server managing unit 2802. Only APIs relating to the present invention are exemplified, although the server managing unit 2802 may include other APIs.

A method getDevice shown in (1) in FIG. 30 returns information of a device found on the network 104. In a general UPnP Specification, only a device having a server function transmits device information of the device having the server function itself to a device connected to the network 104. As such, here, only the device information of a device having the server function can be obtained. However, in the present invention, an application can also set the Friendly Name, and so on, which is an attribute value of the application's own terminal. Consequently, each of the data receiving apparatuses 102 and 103 can provide, to the client application, device information in which the device information of the device itself has been added to the device information of the device having the server function connected to the network 104. The return value is an array of instances of a class which implements a Device interface to be described later.

It is to be noted that when it is possible to obtain information of a client device connected to the network 104, the client device may be included in the array of the device information which is the return value. With this, the client application can obtain information of another data receiving device connected to the network. In this manner, for example, the information of the data receiving apparatus 103 that is to perform playing next can be set as the resume position identifier.

The interface Device shown in (2) in FIG. 30 defines a device on the network, and FIG. 31 shows an API relating to the present information.

The interface ContentServer shown in (3) in FIG. 30 defines an interface for accessing the multimedia server, and FIG. 32 shows an API relating to the present invention. FIG. 31 is a diagram showing an example of a Device interface.

In FIG. 31, method getContentServer obtains the ContentServer supported by the device. When one is not present, NULL is returned. Next, method is Local returns True when the device indicates the device information of its own terminal, and returns False when device information of an apparatus connected to the network 104 is indicated. Furthermore, method setDeviceProperty is for setting, to the device, the value of a property which is one of the device information. An argument Key represents a property name set to the device, an argument Value represents the value to be set. With this, it becomes possible to set the attribute information of the device such as a device name that can be easily understood by the application, and it becomes possible to set attribute information according to a uniform strategy even when the manufacturers of the data receiving apparatuses are different.

As an example, the Friendly Name of the device can be set to LivingRoom by setting "PROP_FRIENDLY_NAME" to the argument Key, and specifying a placement location such as "LivingRoom" to the argument Value. With this, the client application can set the placement location into the Friendly Name at all times, independently of the manufacturer or model of the data receiving apparatus. It is to be noted that, although the method setDeviceProperty is assumed to be an API having Key and Value as arguments here, it is also acceptable to have a method in which a method is prepared for each attribute information to be set, such as setFriendlyName (String Value).

Furthermore, the method setDeviceProperty can only be set when is Local is True, and cannot be set when is Local is False. As such, when method setDeviceProperty cannot be set, the fact that setting is not possible may be notified by sending an Exception, and it is also acceptable to have a method in which the return value is changed into one that can represent the success or failure of a process such as a Boolean, and notify the result through the return value.

FIG. 32 is a diagram showing an example of a ContentServer interface. This defines only an interface relating to the present invention. In FIG. 32, method getRootContainer obtains the root container of the multimedia server. The Container interface shall be described later When the method getRootContainer is called, the network library 2704d generates a Browse action message requesting the multimedia server for information of the root container, by requesting the action transmitting and receiving unit 2803, and transmits the action message to the multimedia server. The Browse action is defined in 2.7.4 of ContentDirectory:1 Service Template Version 1.01 For UPnP™ Version 1.0, Jun. 25, 2002 (NonPatent Reference 1) which is a UPnP AV CDS Specification. Refer to Non-Patent Reference 1 for details. Next, by requesting the action transmitting and receiving unit 2803, the network library 2704d receives the response message from the multimedia server, has the response message interpreted, and obtains the information of the root container. Next, network library 2704d passes the root container information to the content managing unit 2804 and generates an instance of a class which implements a Container interface including extracted attribute information as the root container information. Subsequently, the network library 2704d returns the generated instance as a return value. When the response message is an error, the network library 2704d returns null.

A method requestBrowse in FIG. 32 issues a Browse action having the condition provided by an argument to the multimedia server and obtains information from the multimedia server. The return value is an array of instances of a class which implements a CDSObject interface including information of the received object. The CDSObject interface shall be described later. The argument of the present method is of the same format as used in the Browse action in UPnP AV CDS. An argument objectID of the present method corresponds to the argument ObjectID of the Browse action. Hereinafter, an argument flag corresponds to BrowseFlag, an argument filter corresponds to Filter, an argument startIndex corresponds to StartIndex, an argument requestedCount corresponds to RequestedCount, and sortCriteria corresponds to SortCriteria. Refer to Non-Patent Reference 1 for details.

When the present method is called, the network library 2704d passes the arguments objectID, flag, filter, startIndex, requestCount, and sortCriteria to the action transmitting and receiving unit 2803 so as to generate the Browse action message, and transmit this to the multimedia server. Next, by requesting the action transmitting and receiving unit 2803, the network library 2704d receives the response message from the multimedia server, has the details thereof interpreted, and obtains information of the object specified by the arguments. Next, network library 2704d passes the obtained object information to the content managing unit 2804, generates an instance of a class which implements the CDSObject interface including extracted information for each of the objects, and arranges the instances in an array and returns this as a return value. When the response message is an error, the network library 2704d returns null.

Next, the Java APIs provided by the content managing unit 2804 to the client application shall be described.

FIG. 33 is a diagram showing an example of the Java APIs provided by the content managing unit 2804. Only APIs relating to the present invention are exemplified, although the content managing unit 2804 may include other APIs.

The interface CDSObject shown in (1) in FIG. 33 defines an interface for accessing an object which is a superordinate concept of the container and the item. The network library 2704d represents the object defined by UPnP AV CDS using the class which implements this interface.

FIG. 34 is a diagram showing the definition of the CDSObject. In FIG. 34, method getID returns the ID of the object, using a character string. Furthermore, method getParentID returns the ID of the parent container of the object, using a character string. When the object is a root container, or when the object does not have a parent container, null is returned. Furthermore, method getClass returns the class of the object defined by UPnP AV CDS, using a character string. The class of an object means "object.container", "object.item", and so on. Furthermore, method getMetadata returns the attribute information (content attribute information) added to the object, as the instance of a Metadata class to be described later. With this method, the client application that runs on the data receiving apparatuses 102 and 103 can obtain the resume position and the resume position identifier of the object.

The interface Container shown in (2) in FIG. 33 is a derived interface of the CDSObject interface and defines an interface for accessing a container.

FIG. 35 is a diagram showing the definition of the container. A method getChildCount returns the number of child objects that the container has at that point. A method getChildren returns all the child objects of the container. The return value is an array of instances of a class which implements the CDSObject. Null is returned when the process fails. The method getChild returns a child object having an ID that is the same as that provided by the argument objected, among the child objects of the container. When such an object is present, the method getChild returns the instance thereof. Furthermore, the method getChild returns null when such a child object is not present in the container.

The interface ContentItem shown in (3) in FIG. 33 is a derived interface of the CDSObject interface and defines an interface for accessing an item.

FIG. 36 is a diagram showing the definition of the ContentItem. A method requestSetMediaTime sets the resume position to the resume position and resume position identifier managed by the data transmitting apparatus 101.

It is to be noted that, when the adding of a resume position is desired, the client application sets the new identifier that the client application wants to set, to the argument Identifier which indicates the resume position identifier. Furthermore, when the updating of a resume position is desired, the client application sets, to the argument Identifier, the resume position identifier obtained by the getMetadata method of the Metadata interface to be described later.

Here, by setting "−1" to the argument Time, it is possible to request the deletion of the resume position set using the resume position identifier. Here, when the method requestSetMediaTime is called, the content managing unit 2804 creates the updated resume position information table. Subsequently, the content managing unit 2804 passes the resume position information table before updating and the updated resume position information table to the action transmitting and receiving unit 2803 and sends a CDS:UpdateObject transmission request. At this time, an example of the method for creating the updated resume position information table is shown in FIG. 39.

Figure 39:
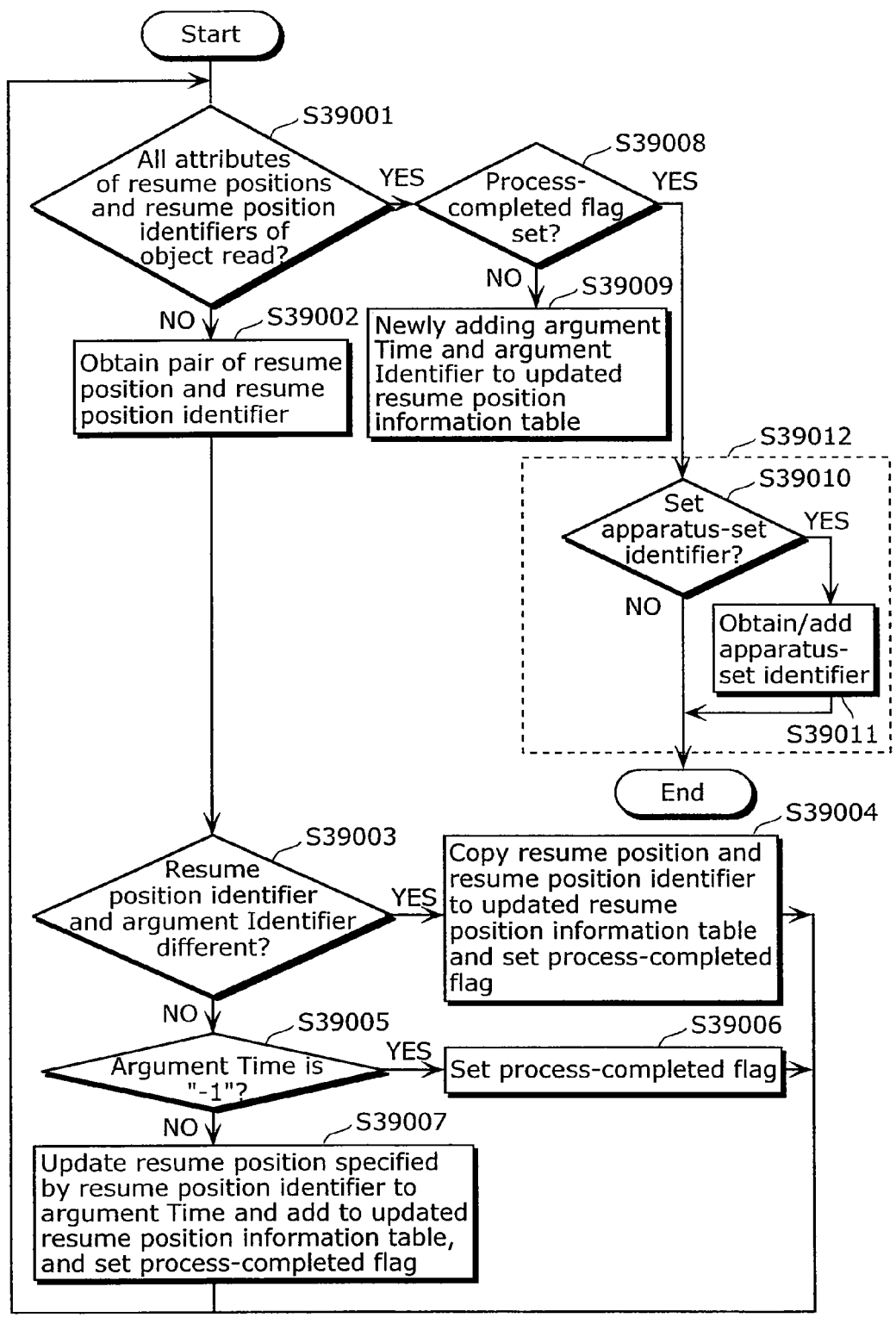
FIG. 39 is a diagram showing an example for the creation of the resume position information table created by the content managing unit 2804 in the embodiment of the present invention.

FIG. 39 is a diagram showing an example of the method for creating the updated resume position information table.

Example for Deletion

Here, the resume position information table before updating is assumed to be that in FIG. 29, the argument Time of the method requestSetMediaTime is "−1", and the argument Identifier is "LivingRoom".

In order to create the updated resume position information table, the content managing unit 2804 judges whether or not the resume position information table before updating in FIG. 29 has been read up to the end (S39001). When not read up to the end, the content managing unit 2804 obtains the pair of the resume position "00:30:00" and the resume position identifier "LivingRoom" (S39002). Next, the content managing unit 2804 compares the resume position identifier "LivingRoom" and the argument Identifier "LivingRoom" (S39003) to verify a match. Next, since the argument Time matches "−1" (S39005), the content managing unit 2804 sets a process-completed flag without copying the read resume position "00:30:00" and resume position identifier "LivingRoom" to the updated resume position information table (S39006). The content managing unit 2804 verifies and obtains the subsequent resume position and resume position identifier (S39001, S39002) and, since the resume position identifier and the argument Identifier are different (S39003), copies the obtained resume position and resume position identifier to the updated resume position information table, and sets a process-completed flag (S39004). When the reading of all the resume positions and the resume position identifiers is completed, the content managing unit 2804 verifies whether a process-completed flag has been set (S39008) and, since a flag is set, judges whether or not to subsequently set an apparatus-set identifier (S39010). When setting an apparatus-set identifier, the content managing unit 2804 obtains an apparatus-set identifier and adds it (S39011). Here, specific examples of an apparatus-set identifier are an application identifier and the Friendly Name set by the client application for the previously described Device interface. It is to be noted that the application identifier is the identifier of an application used for judging the application to be activated in the activation of an application by the AM 2704*b*, and Application_id, Organization_id, or Group_identifier, and so on, are examples thereof.

Whether or not to set an apparatus-set identifier can be determined in advance between the data transmitting apparatus 101 and the data receiving apparatus 102 and the data receiving apparatus 103, and the setting of the apparatus-set identifier indicated by the dotted line in S39012 need not necessarily be performed.

Example for Updating

Here, the resume position information table before updating is assumed to be that in FIG. 29, the argument Time of the method requestSetMediaTime is "00:40:00", and the argument Identifier is "LivingRoom". The processes up to the comparison between the resume position identifier and the argument Identifier (S39003) for updating are the same as those for deletion. Here, since the resume position identifier and the argument Identifier are the same, the content managing unit 2804 verifies the argument Time (S39005) and upon verifying that the argument Time is not "−1", the content managing unit 2804 adds, to the updated resume position information table, the pair of the resume position resume position "00:40:00" and resume position identifier "LivingRoom" in which the resume position specified by the resume position identifier has been updated to the argument Time "00:40:00" (S39007). Since the subsequent processes are the same as those in the example for deletion, description shall be omitted.

Example for Adding

Here, the resume position information table before updating is assumed to be that in FIG. 29, the argument Time of the method requestSetMediaTime is "00:40:00", and the argument Identifier is "Ken'sRoom". In adding, since an argument Identifier is not present in the resume position information table before updating, the resume position information table before updating is copied to the updated resume position information table by repeating S39003 and S39004. Subsequently, after processing all the resume positions and resume position information, the content managing unit 2804 verifies whether a process-completed flag has been set (S39008), and adds the argument Time and the argument Identifier to the updated resume position information table when a flag has not been set. When a flag has been set, the same process as those described above are performed and thus their description shall be omitted.

It is to be noted that although a method which adopts the two arguments of the argument Time indicating the resume position and the argument Identifier indicating the resume position identifier is described here with regard to the requestSetMediaTime, the argument of the requestSetMediaTime may be Time only. At this time, the content managing unit 2804 obtains the resume position identifier Identifier from the resume position when the resume request for content is performed, using the resume position information table in FIG. 29. Subsequently, when the updating of the resume position is specified by the requestSetMediaTime, the argument of the requestSetMediaTime may be judged as the resume position for the resume position identifier Identifier recorded in advance, and the updated resume position information table may be generated in accordance with the processes in FIG. 39.

It is to be noted that NetActionHandler which is the third argument of the requestSetMediaTime is specified in order for an application to set the Handler which receives the result of the resume position information update request in the data transmitting apparatus 101.

An interface Metadata shown in (4) in FIG. 33 is a class for holding attribute information.

FIG. 37 is a diagram showing the definition of the Metadata. In FIG. 37, method getKeys returns all the names (keys) of the attribute information set in the Metadata instances, using an array of character strings. It is to be noted that, when the Metadata instances have a hierarchical structure, that is, when a value for a key includes a Metadata instance, it is assumed that the key included in the Metadata instance set in such value is not included in the return value. In other words, the collection of only the keys of the Metadata instances is returned.

The method getMetadata provides the name of the attribute information using the argument Key, and returns the value of such attribute information. Therefore, by specifying the name (for example, ocap:PresentationPoint) of the attribute information of the resume position and the resume position identifier in the argument Key, and calling the method getMetadata, the resume position and the resume position identifier can be obtained. The Metadata instance returns null when it does not have the attribute information under the name provided by the argument.

An instance NetActionHandler shown in (5) in FIG. 33 is used for notifying the result of a non-synchronized process to an application.

FIG. 38 is a diagram showing the NetActionHandler interface. Here, whether or not a resume position change request specified in the requestSetMediaTime is successful in the data transmitting apparatus 101 is notified to the application by calling a Notify method.

(Modifications)

It is to be noted that, although the present invention is described based on the above-described embodiment, the present invention is not limited to such above-described embodiment. The present invention also includes such cases as described below.

(1) Although the data transmitting apparatus 101 is an STB which receives a digital broadcast in the above-described embodiment, the data transmitting apparatus 101 is not limited to such. The data transmitting apparatus 101 may be configured to receive content from a network and store the received content, without having a tuner. The configuration in this case is the same as that in FIG. 27. Furthermore, data may be stored using a means other than a network.

(2) Although, in the above-described embodiment, the arguments of the method requestSetMediaTime of the ContentItem interface are Time, which indicates the resume position, and Identifier, which indicates the resume position identifier, a character string may be adopted as the argument and the resume position and the resume position identifier may be specified by using a CSV list in such character string.

(3) Although, in the present embodiment, upon receiving a request for updating the resume position from a data receiving apparatus, the data transmitting apparatus 101 updates the stored resume position in accordance with the request, the data transmitting apparatus 101 may inquire about whether or not the resume position updating is permitted to the server application and update the resume position when permitted by the server application. Furthermore, the data transmitting apparatus 101 may pass the resume position update request to the server application and the server application may perform the updating of the resume position. This can be implemented by adding a handler which performs the notification to the server application.

(4) It is acceptable that a part or all of the constituent elements making up each of the above-described apparatuses is made from one system LSI (Large Scale Integration circuit). The system LSI is a super multi-function LSI that is manufactured by integrating plural components in one chip, and is specifically a computer system which is configured by including a microprocessor, a Read Only Memory (ROM), a Random Access Memory (RAM), and so on. A computer program is stored in the RAM. The system LSI accomplishes its functions through the operation of the microprocessor in accordance with the computer program.

(5) It is acceptable that a part or all of the constituent elements making up each of the above-described apparatuses is made from an IC card that can be attached to/detached from each apparatus, or a stand-alone module. The IC card or the module is a computer system made from a microprocessor, a ROM, a RAM, and so on. The IC card or the module may include the super multi-function LSI. The IC card or the module accomplishes its functions through the operation of the microprocessor in accordance with the computer program. The IC card or the module may also be tamper-resistant.

(6) Aside from a data transmitting apparatus and a data receiving apparatus, the present invention may be the respective methods indicated in the above-described embodiment, by which such apparatuses operate. Furthermore, the present invention may also be a computer program which causes a computer to execute such methods, or a digital signal made from the computer program. Furthermore, the present invention may be a computer-readable recording medium, such as a flexible disk, a hard disk, a Compact Disk Read Only Memory (CD-ROM), a Magneto-Optical disk (MO), a Digital Versatile Disk (DVD), a DVD-ROM, a DVD-RAM, a BD (Blu-ray Disc), or a semiconductor memory, on which the computer program or the digital signal is recorded.

Furthermore, the present invention may also be the computer program or the digital signal transmitted via an electrical communication line, a wireless communication line or a wired communication line, a network represented by the Internet, a data broadcast, and so on.

Furthermore, the present invention may be a computer system including a microprocessor and a memory, with the aforementioned computer program being stored in the memory and the microprocessor operating in accordance with the computer program.

Furthermore, the present invention may also be implemented in another independent computer system by recording the program or the digital signal on the recording medium and transferring the recording medium, or by transferring the program or the digital signal via the network, and the like.

(7) Although broadcasted multimedia content are described as the multimedia content stored by the data transmitting apparatus 101 in the above-described embodiment, the present invention is not limited to such. For example, the data transmitting apparatus may store multimedia content obtained through a network and deliver the multimedia content to the data receiving apparatuses 102 and 103.

(8) The present invention may also be a combination of the above-described embodiment and the aforementioned modifications.

As described above, the data transmitting apparatus and the data receiving apparatus according to the present invention enable the precise resumption of playing even when viewing or playing of multimedia content is paused and resumed in a data receiving apparatus, and even when resuming in another data receiving apparatus in the network.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

Industrial Applicability

The data transmitting apparatus and the data receiving apparatus according to the present invention have the remarkable effect in which, in the communication of data involved in the playing, and so on, of multimedia content through a network, paused data transmission can be properly resumed even between apparatuses of different manufacturers or different models, and are thus useful as a server apparatus, receiving terminal, device control apparatus, data outputting method, or device control method for multimedia content, in a network environment such as a home network for example.

What is claimed is:

1. A data transmitting apparatus which stores multimedia content including at least one of video and audio, and transmits the multimedia content to a receiving apparatus via a network, said data transmitting apparatus comprising:
a storage configured to store the multimedia content and attribute information of the multimedia content;
a transmitter configured to transmit at least part of the multimedia content to the receiving apparatus;
a receiver configured to receive, from the receiving apparatus, an update request which indicates a resume position and requests updating of the attribute information, the resume position being a position, in the multimedia content to be transmitted by said transmitter to the receiving apparatus, at which playing is to be resumed; and
a manager configured to update the attribute information stored in said storage, in accordance with the update request from the receiving apparatus which is received by said receiver,
wherein said manager is further configured to update the attribute information stored in said storage, so that resume position information, including the resume position indicated by the update request from the receiving apparatus and a resume position identifier that is set using information of the receiving apparatus that sends the update request, is included in the attribute information stored in said storage.

2. The data transmitting apparatus according to claim 1,
wherein said receiver is configured to receive, from the receiving apparatus, the update request indicating the resume position and the resume position identifier, and
said manager is configured to update the attribute information stored in said storage so that the resume position and the resume position identifier indicated by the update request are included in the attribute information.

3. The data transmitting apparatus according to claim 1,
wherein said receiver is configured to receive the update request indicating application information regarding a Java application program that runs on the receiving apparatus, and
said manager is further configured to determine, using the application information indicated by the update request, whether or not to update the attribute information in accordance with the update request, and to update the attribute information stored in said storage upon determining that the attribute information should be updated.

4. A data receiving apparatus which receives multimedia content including at least one of video and audio, from a transmitting apparatus via a network, said data receiving apparatus comprising:
a Java processor configured to execute a Java™ application program;
a receiver configured to receive at least part of the multimedia content and attribute information of the multimedia content from the transmitting apparatus via the network;
a manager configured to generate an update request according to an instruction from the Java application program executed by said Java processor, the update request indicating a resume position and a resume position identifier, and requesting, to the transmitting apparatus, updating of the attribute information stored in the transmitting apparatus, the resume position being a position, in the multimedia content to be received by said receiver, at which playing is to be resumed, and the resume position identifier being set based on information recorded in said data receiving apparatus; and
a transmitter configured to transmit the update request generated by said manager to the transmitting apparatus.

5. The data receiving apparatus according to claim 4,
wherein said manager is configured to receive the resume position and a resume position identifier for identifying the resume position from the Java application program executed by said Java processor, and to generate the update request indicating the resume position and the resume position identifier that have been received.

6. The data receiving apparatus according to claim 4,
wherein the information recorded in said data receiving apparatus is application information regarding the Java application program, and
said manager is configured to set the application information as the resume position identifier.

7. The data receiving apparatus according to claim 4,
wherein the information recorded in said data receiving apparatus is information set by the Java application program, regarding said data receiving apparatus, and
said manager is configured to set the information regarding said data receiving apparatus as the resume position identifier.

8. A data transmitting method of storing multimedia content including at least one of video and audio, and transmitting the multimedia content to a receiving apparatus via a network, the data transmitting method comprising:
storing the multimedia content and attribute information of the multimedia content;
transmitting at least part of the multimedia content to the receiving apparatus;
receiving, from the receiving apparatus, an update request which indicates a resume position and requests updating of the attribute information, the resume position being a position, in the multimedia content to be transmitted to the receiving apparatus, at which playing is to be resumed; and
updating the attribute information that is stored, in accordance with the received update request from the receiving apparatus,
wherein, in the updating, the attribute information that is stored is updated, so that resume position identification information, including the resume position indicated by the update request from the receiving apparatus and a resume position identifier that is set using information of the receiving apparatus obtained from the receiving apparatus that sends the update request, is included in the attribute information.

9. A data receiving method performed by a data receiving apparatus which receives multimedia content including at least one of video and audio, from a transmitting apparatus via a network, the data receiving method comprising:

executing a Java™ application program;

receiving at least part of the multimedia content and attribute information of the multimedia content from the transmitting apparatus via the network;

generating an update request according to an instruction from the executed Java application program, the update request indicating a resume position and a resume position identifier and requesting, to the transmitting apparatus, updating of the attribute information stored in the transmitting apparatus, the resume position being a position, in the multimedia content to be received, from which playing is to be resumed, and the resume position identifier being set based on information recorded in the data receiving apparatus; and transmitting the generated update request to the transmitting apparatus.

* * * * *